(12) United States Patent
Alsakka et al.

(10) Patent No.: US 12,272,833 B2
(45) Date of Patent: Apr. 8, 2025

(54) SCALABLE AND MANAGEABLE ENERGY STORAGE SYSTEM AND METHOD

(71) Applicant: Blue Volta Technology Inc., San Jose, CA (US)

(72) Inventors: Louay Alsakka, Cupertino, CA (US); Maxim Moiseev, Santa Clara, CA (US)

(73) Assignee: Blue Volta Technology Inc., San Jose, CA (US)

( * ) Notice: Subject to any disclaimer, the term of this patent is extended or adjusted under 35 U.S.C. 154(b) by 655 days.

(21) Appl. No.: 17/594,517

(22) PCT Filed: Apr. 21, 2020

(86) PCT No.: PCT/US2020/029108
§ 371 (c)(1),
(2) Date: Oct. 20, 2021

(87) PCT Pub. No.: WO2020/219440
PCT Pub. Date: Oct. 29, 2020

(65) Prior Publication Data
US 2022/0216558 A1    Jul. 7, 2022

Related U.S. Application Data

(60) Provisional application No. 62/837,015, filed on Apr. 22, 2019.

(51) Int. Cl.
*H01M 50/213* (2021.01)
*H02J 7/00* (2006.01)

(52) U.S. Cl.
CPC ......... *H01M 50/213* (2021.01); *H02J 7/0016* (2013.01); *H02J 7/0024* (2013.01); *H02J 7/0063* (2013.01); *H01M 2220/20* (2013.01)

(58) Field of Classification Search
CPC .... B60L 58/19; B60L 58/22; H01M 2220/20; H01M 50/213; H02J 7/00032; H02J 7/0013; H02J 7/0016; H02J 7/0019; H02J 7/0024; H02J 7/0031; H02J 7/0063; H02J 7/007194; Y02T 10/70
See application file for complete search history.

(56) References Cited

U.S. PATENT DOCUMENTS

2014/0287278 A1   9/2014   Despesse
2018/0099579 A1   4/2018   Hale

FOREIGN PATENT DOCUMENTS

WO    2020219440 A1    10/2020

OTHER PUBLICATIONS

International Search Report and Written Opinion for International PCT Application No. PCT/US2020/029108, dated Jul. 3, 2020.

*Primary Examiner* — Victoria H Lynch
(74) *Attorney, Agent, or Firm* — K&L Gates LLP

(57) ABSTRACT

A scalable and manageable energy storage system and methods are disclosed. By accounting for the characteristics of an individual cell in a battery, the disclosed system and method prevents cell stress to extend the useful life span of the cell. A dynamic wiring topology allows the scalable and manageable energy storage system to directly control a load or be charged by a volatile energy source.

27 Claims, 17 Drawing Sheets

SCALABLE AND MANAGEABLE ENERGY STORAGE SYSTEM AND METHOD

CROSS-REFERENCE TO RELATED APPLICATIONS

This application is a U.S. National Stage Entry under 35 U.S.C. § 371 of International Patent Application No. PCT/US2020/029108, entitled SCALABLE AND MANAGEABLE ENERGY STORAGE SYSTEM AND METHOD, filed Apr. 21, 2020, which claims the benefit of U.S. Provisional Patent Application Ser. No. 62/837,015 entitled "Scale-able and Manageable Energy Storage System and Method" filed on Apr. 22, 2019, the entire disclosures of which are hereby incorporated by reference herein.

TECHNICAL FIELD

The present disclosure generally relates to energy storage systems and methods. More particularly, the present disclosure relates to scalable and manageable energy storage systems and methods.

BACKGROUND

Chemical-based cells (e.g., Lithium, Nickel, etc.) are currently the most popular choice for energy storage systems due to their high energy density. Chemical-based cells, however, are very sensitive to variations in voltage, current, and/or temperature and have a relatively short life cycle, which can be defined as, for example, the maximum number of charge/discharge cycles. Existing fast charge methods shorten the life cycle even further, which is why many manufacturers of energy storage-based products discourage frequent fast-charging.

When an energy storage system is built using a single cell, for example in mobile devices (smart phones, laptops, tablets, etc.), most manufacturers use advanced algorithms to enhance the life cycle/fast charge of the cell. This approach, however, does not scale for energy storage built on large number of cells.

The existing solutions aggregate the cells into battery packs and apply the same charge voltage to all the cells in the battery pack. The existing systems have statically wired sets of battery cells and high power regulators.

By taking into account the characteristics of an individual cell in the battery pack, the present disclosure provides a scalable and manageable energy storage system and method to prevent the stress of the cell which results in extending the useful life span of the cell.

The present disclosure also provides a dynamic wiring topology to enable an energy storage system to directly control a load, such as, for example, an electric motor, or be charged by volatile energy source, such as, for example, a wind turbine.

SUMMARY

In one aspect, the present disclosure provides a scalable energy storage system, comprising: a power rack comprising: at least one power bank comprising: a control power source; a power bank management unit; and a plurality of energy cells interconnected by external energy rails, wherein each one of the plurality of energy cells comprises a first cell control unit, the cell control unit comprising: at least one energy storage element; a control power rail; a control circuit having an input coupled to the at least one energy storage element by an internal energy rail, an output coupled to a cell energy rail, and coupled to the control power source through the control power rail; a plurality of energy rail switches coupled to the control circuit through the cell energy rail; wherein the control circuit is configured to: control the plurality of energy rail switches to couple the cell energy rail to the external energy rails in a predetermined configurable dynamic wiring topology to implement a dynamic wiring system; and communicate with a second cell control unit using a cell communication protocol.

In another aspect, the present disclosure provides a method of controlling and managing a cell control unit including a first cell control unit, the cell control unit including at least one energy storage element; a control power rail; a control circuit having an input coupled to the at least one energy storage element by an internal energy rail, an output coupled to a cell energy rail, and coupled to the control power source through the control power rail; a plurality of energy rail switches coupled to the control circuit through the cell energy rail, wherein the control circuit is configured to control the plurality of energy rail switches to couple the cell energy rail to the external energy rails in a predetermined configurable dynamic wiring topology to implement a dynamic wiring system; and communicate with a second cell control unit using a cell communication protocol; wherein the control circuit includes at least one regulator coupled to the internal energy rail and the cell energy rail, wherein the at least one regulator is configured to charge or discharge the at least one energy storage element according to characteristics of the at least one energy storage element; the method comprising: establishing a link, by the control circuit, between the cell control unit and a master power bank management unit; transitioning, by the control circuit, the energy storage element to a low power mode; receiving, by the control circuit, a command through the cell control protocol; decoding, by the control circuit, a task directed by the command and executing one of: calibrating, by the control circuit, the energy storage element, wherein the received command is a calibration command; charging, by the control circuit, the energy storage element, wherein the received command is a charge command; or discharging, by the control circuit, the energy storage element, wherein the received command is a discharge command.

In another aspect, the present disclosure provides a method of managing the aggregation and coordination of energy by a power bank management unit, the power bank management unit coupled to a plurality of energy cells located in a power bank each one of the plurality of energy cells including a cell control unit, the power bank management unit configured to communicate with each one of the plurality of energy cells through a cell communication protocol, the power bank management unit comprising a processor and a memory storing instructions executable by the processor, the method comprising: establishing, by the processor, a communication link between the power bank management unit and the cell control units of each one of the plurality of energy cells through the cell communication protocol; enumerating, by the processor, the plurality of energy cells located in a power bank, wherein each one of the energy cells comprises an element management unit and an energy storage element forming a single managed cell control unit; configuring, by the processor, all the energy cells in a low power mode through the cell control; receiving, by the processor, a command; decoding, by the processor, a task directed by the command and executing one of: sending a charge command, by the processor, to a selected number of energy cells wherein the command is a charge command; and sending a discharge command, by the processor, to a selected number of energy cells wherein the command is a charge command.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

In one or more various aspects, related systems include but are not limited to circuitry and/or programming for effecting herein-referenced method aspects; the circuitry and/or programming can be virtually any combination of hardware, software, and/or firmware configured to affect the herein-referenced method aspects depending upon the design choices of the system designer. In addition to the foregoing, various other method and/or system aspects are set forth and described in the teachings such as text (e.g., claims and/or detailed description) and/or drawings of the present disclosure.

Further, it is understood that any one or more of the following-described forms, expressions of forms, examples, can be combined with any one or more of the other following-described forms, expressions of forms, and examples.

The foregoing summary is illustrative only and is not intended to be in any way limiting. In addition to the illustrative aspects, embodiments, and features described above, further aspects, embodiments, and features will become apparent by reference to the drawings and the following detailed description.

FIGURES

The novel features of the described forms are set forth with particularity in the appended claims. The described forms, however, both as to organization and methods of operation, may be best understood by reference to the following description, taken in conjunction with the accompanying drawings in which:

DETAILED DESCRIPTION

Figure 1:
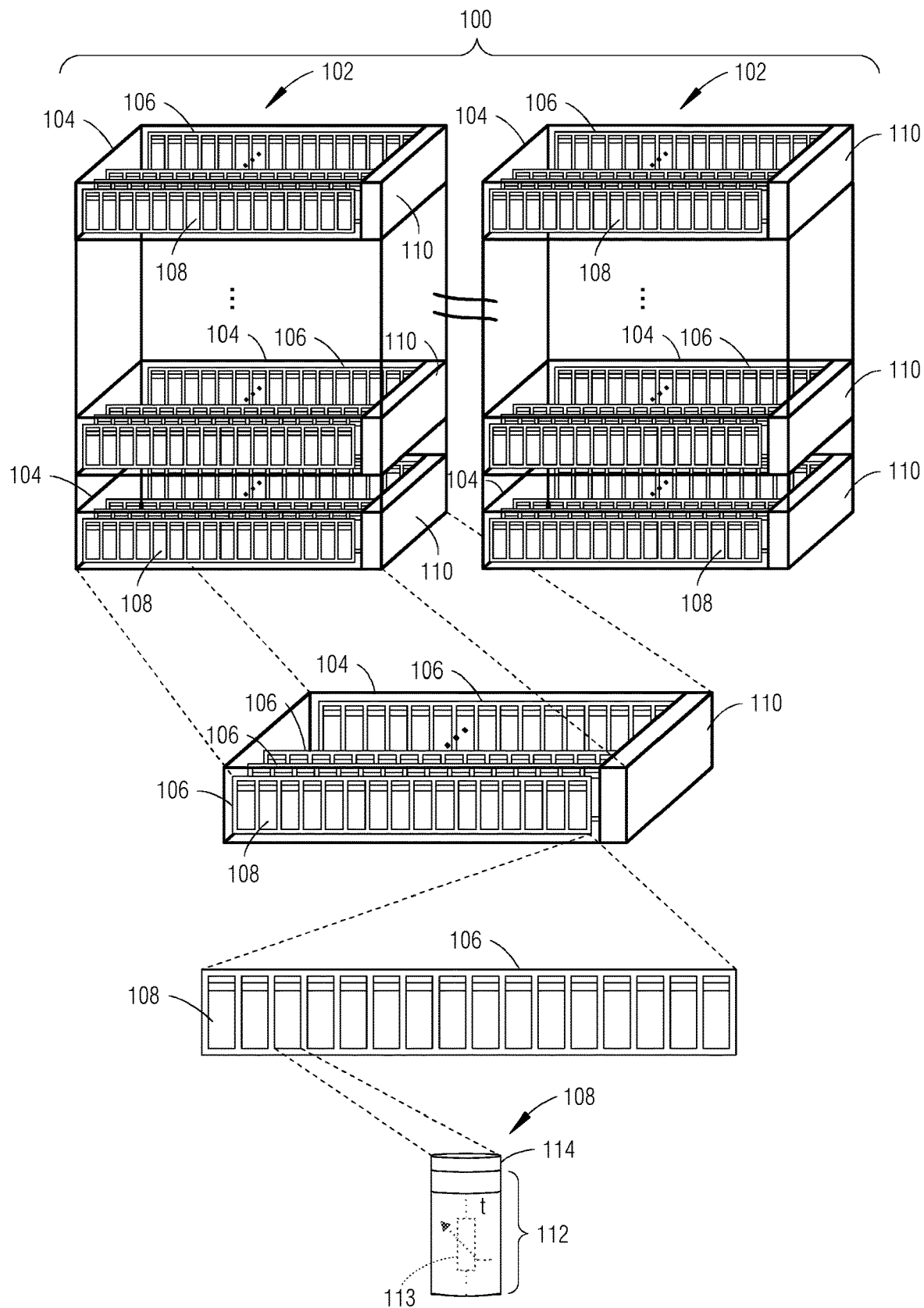
FIG. 1 illustrates a scalable energy storage system, in accordance with at least one aspect of the present disclosure.

Before explaining various forms of energy storage systems and methods, and more particularly, scalable and manageable energy storage systems and methods in detail, it should be noted that the illustrative forms are not limited in application or use to the details of construction and arrangement of parts illustrated in the accompanying drawings and description. The illustrative forms may be implemented or incorporated in other forms, variations and modifications, and may be practiced or carried out in various ways. Further, unless otherwise indicated, the terms and expressions utilized herein have been chosen for the purpose of describing the illustrative forms for the convenience of the reader and are not for the purpose of limitation thereof.

Further, it is understood that any one or more of the following-described forms, expressions of forms, examples, can be combined with any one or more of the other following-described forms, expressions of forms, and examples.

In one aspect, the present disclosure is directed, as stated above, scalable and manageable energy storage systems and methods for chemical-based cells (e.g. Lithium, Nickel etc.), which are currently the most popular choice for energy storage systems due to their high energy density. Chemical-based cells, however, they are very sensitive to voltage, current, and/or temperature variations and have a relatively short life cycle, defined as, for example, the maximum number of charge/discharge cycles. Existing fast charge methods shorten the life cycle even further, which is why many manufacturers of energy storage-based products discourage frequent fast-charging.

When an energy storage system is built using a single battery cell, for example in mobile devices (smart phones, laptops, tablets, etc.), most manufacturers use advanced algorithms to enhance the life cycle/fast charge of the cell. This approach, however, does not scale for energy storage built on a large number of cells. The present disclosure and the appended claimed solves this problem.

In one aspect, the present disclosure provides a scalable and cost effective solution to energy storage by optimizing the operating condition (voltage/current) of each cell in the system during charge and discharge cycles. This optimization extends the life cycle of the cell while enabling fast charge and discharge cycles and increases the overall system efficiency.

In one aspect, the claimed subject matter differs from what currently exists. In that regards, the present disclosure provides an energy storage system that takes into account the individual characteristics of each cell and allows a large energy storage system to be built based on that. A large energy storage system may include at least two cells, and more particularly may include 10,000, 20,000, or up to 100,000 cells or more. In addition, the present disclosure provides an energy storage system that enables the dynamic change of the wiring topology, which allows the energy storage system to instantaneously react to a change in load/charge profile.

Various aspects of the present disclosure provide an improvement to existing energy storage systems. The energy storage system according to at least one aspect of the present disclosure considers the individual characteristics of each energy cell and enables the realization of a large scale energy storage system while achieving optimized charge/discharge rate, maximum current/voltage, state of charge, state of life, life cycle, and insuring safety and other performance metrics. In addition, the energy storage system according to at least one aspect of the present disclosure enables the dynamic change of a wiring topology which allows the energy storage system to instantaneously react to a change in load or charge profile.

Existing energy storage systems (battery pack) apply the same voltage to each battery cell. This configuration, however, causes undue stress to the battery cells, shortens their life span, and lowers the maximum amount of energy that the energy storage system is capable of retaining.

Existing energy storage systems are not cost effective or capable of low-latency response to a change of the load or charge profile because the statically wire the battery cells and employ high power regulators.

By accounting for the characteristics of an individual cell in a battery, the energy storage system according to at least one aspect of the present disclosure avoids stressing the cell and results in extending the useful life span of the cell.

The energy storage system according to at least one aspect of the present disclosure provides a dynamic wiring topology that allows the energy storage system to directly control a load such as, for example, an electric motor or be charged by a volatile energy source such as, for example, a wind turbine.

At least one aspect of the energy storage system according to the present disclosure comprises, for example, the following elements or components:

1. A cell of a battery of cells, or energy storage element (ESE), is a building block of at the energy storage system.

2. A cell control unit (CCU) is configured to independently control and manage one or more than one energy storage element.

3. The cell control unit employs input and output regulators, such as, such as buck, boost, buck/boost, DC/DC converters, DC/AC converters, AC/AC converters, current source, low dropout (LDO) regulator, etc., to deliver energy to/from the energy storage element. An input regulator is employed during a charge cycle and an output regulator is employed during a discharge cycle.

4. The cell control unit also includes electrical energy rail switches for electrically connecting/disconnecting energy storage element cell energy rails (CER) to external energy rails (EER).

5. The external energy rails are connected to a dynamic wiring system (DWS) that allows multiple dynamic wiring topologies (DWT) to be chosen at run time using switches at the energy storage element level. Topology refers to configuration of serial/parallel connections of energy storage elements to change the overall current/voltage of a power bank.

6. Each cell control unit has an embedded microprocessor unit, or similar control circuit, that executes dedicated firmware. This firmware optimizes and manages the input/output regulators and energy rail switches depending on the system mode of operation, energy storage element state of charge (SoC), energy storage element state of life (SoL), factory calibrations, current element temperature or other parameters to maximize storage energy element life cycle, rate of charge/discharge, safety, or other desired metrics.

7. The power bank also has dedicated firmware that manages the aggregation of energy to/from the energy storage elements, and can coordinate the dynamic wiring system and energy storage element regulators/switches in response to the dynamics of external charge/discharge profiles. These functions are implemented in a power bank management unit (PBMU).

8. Coordination between power bank management unit firmware and cell control unit firmware is achieved using a cell communication protocol (CCP) that allows the exchange of control and status messages using broadcast/multicast/unicast messages, for example.

9. A power bank also includes a control power source (CPS), which powers a control power rail (CPR), which powers the control circuits such as, for example, the digital logic or analog circuit, of each cell control unit, independently from the energy storage element.

10. Multiple power banks can be integrated together into a power rack. The multiple power banks also can be connected using a rack dynamic wiring system (RDWS) to support multiple power bank wiring topologies and provide wide dynamic range of charge/discharge profiles.

11. The power bank management units within the power rack can communicate and coordinate with each other, with the outside world, and/or with an external management unit that control the whole power rack.

In one aspect, the cell of a battery of cells, or energy storage element, may be considered a building block of any energy storage system. The energy storage element may be Lithium-based, Nickel-based, a supercapacitor, or any other existing or future rechargeable battery technology. Each energy storage element has unique characteristics and performance metrics such as rate of charge/discharge, maximum current/voltage it is capable of supporting safely, temperature dependency, life cycle or percentage of degradation of capacity as a function of number of charge/discharge cycles the energy storage element went through during its usage, state of charge or the amount of energy left in an energy storage element, which is also a function of life cycle, current rate of charge/discharge, temperature, or other elements.

When an energy storage system is built using a single energy storage element such as, for example, in mobile devices (smart phones, laptops, tablets, etc.), most manufacturers use advanced algorithms to take into account the unique characteristics of the energy storage element mentioned above to enhance the charge/discharge rate, maximum current/voltage, state of charge, state of life, life cycle, insure safety, among other performance metrics.

When a large number of energy storage elements is aggregated in energy storage applications, however, they are stacked in batteries or banks; the bank behaves as one large energy element when charged/discharged. As a result, the uniqueness of each single energy storage element is ignored, which limits the system performance by the weakest element in the stack and/or causes non-optimized stress on some energy storage elements which will affect performance, safety, life cycle and other characteristics of the weak energy storage elements, resulting in degrading charge/discharge rate, maximum current/voltage, state of charge, life cycle, safety, and other performance characteristics of the entire system.

A scalable and manageable energy storage system described herein allows the aggregation of a large number of energy storage elements while taking into account the unique characteristics of each energy storage element, allowing the scalable and manageable energy storage system to achieve the most optimized charge/discharge rate, maximum current/voltage, state of charge, life cycle, insure safety, and other performance metrics.

Turning now to the figures, FIG. 1 illustrates a scalable energy storage system 100, in accordance with at least one aspect of the present disclosure. The scalable energy storage system 100 includes one or more than one power rack 102 that integrates one or more than one power bank 104. A power bank 104 may include one or more than one groups 106 of energy cells 108 and a power bank management unit 110. Each energy cell 108 in the group 106 may include an energy storage element 112. In some aspects, the power banks 104 are configured to communicate externally and coordinate to provide a larger scalable energy storage system (SESS).

The power bank 104 comprises a control power source to provide digital control power to all control power rails described herein as well as to the power bank management unit 110, thus providing independence of the control logic from the state of the energy storage elements 112. The power banks 104 can be connected together using a rack dynamic wiring system that connects bank energy rails into rack energy rails using dynamic configurations. The power bank management unit 110 of each power bank 104 within the rack 102 can communicate with each other as well as with external world.

In one aspect, the power bank management unit 110 comprises digital logic and analog circuits and provides communication with cell control units described herein to manage and coordinate the operation of the energy cells 108, groups 106 of energy cells 108, and power bank 104 operations including the implementation of a dynamic wiring system described herein. The digital portion of the power bank management unit 110 comprises one or more than one processor configured to execute embedded management firmware, memory, nonvolatile storage storing pertinent data and processor instructions, programmable logic, field programmable gate array (FPGA), discrete digital logic circuits, or combinations thereof. The management firmware also implements a cell communication protocol described herein as well as external power bank 104 communication and coordinates the operations of the cell control units to achieve the desired voltage and current on the bank energy rail. The power bank management unit 110 firmware also maintains current and historical states of the power bank 104 and its energy storage elements 112.

In one aspect, the building block of the scalable energy storage system 100 is an energy storage element 112. The energy storage element 112 may be a form of electric battery cell that can hold energy at certain densities and be charged and discharged multiple times. Each electric energy storage cell 112 can be built using any existing or future technology like Lithium-based, Nickel-based, supercapacitor, lead-acid, or any other existing or future rechargeable battery technology. Each energy storage element 112 has unique characteristics and performance metrics such as rate of charge/discharge, maximum current/voltage it is capable of supporting safely, temperature dependency, life cycle or percentage of degradation of capacity as a function of number of charge/discharge cycles the energy storage element 112 went through during its usage, state of charge or the amount of energy left in an energy storage element 112, which is also a function of life cycle, current rate of charge/discharge, temperature, or other elements.

The scalable and manageable energy storage system 100 described herein allows the aggregation of a large number of energy storage elements 112 while taking into account the unique characteristics of each energy storage element 112, allowing the scalable and manageable energy storage system 100 to achieve the most optimized charge/discharge rate, maximum current/voltage, state of charge defined as the amount of energy stored by the element 112, state of life defined as the maximum usable power storage at present moment, life cycle, safety, and other performance metrics.

Figure 2:
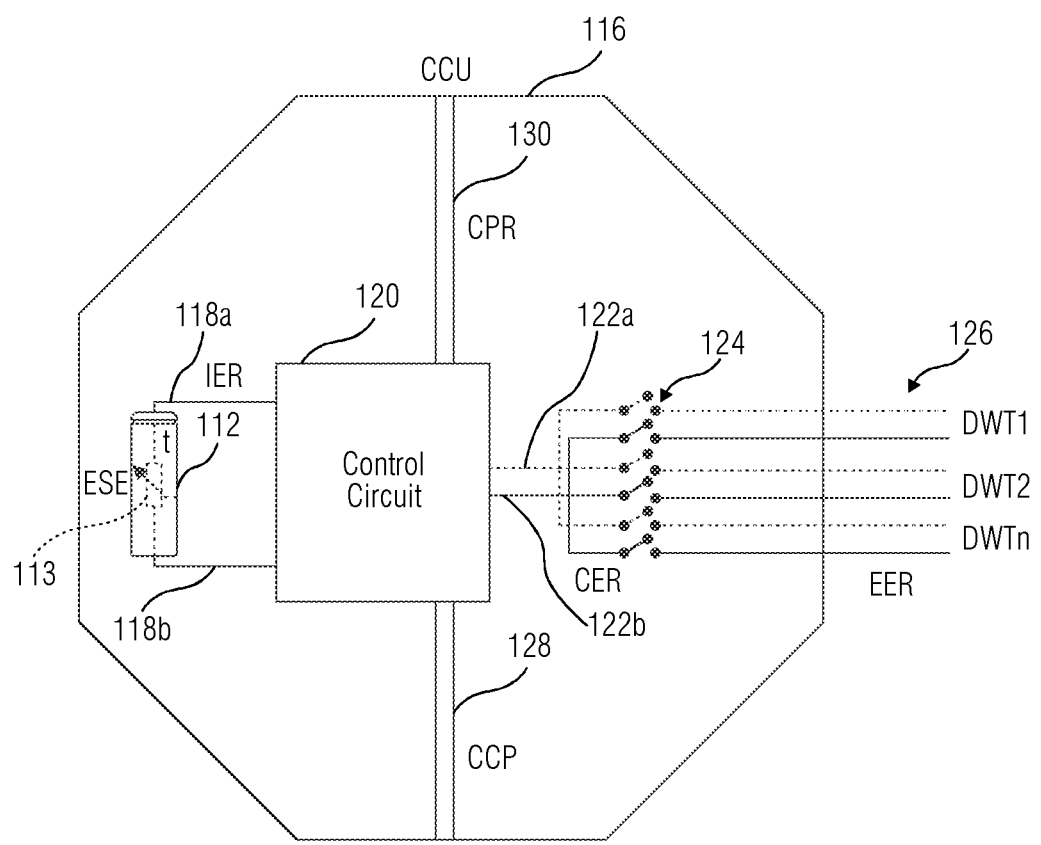
FIG. 2 illustrates a cell control unit configured to independently control and manage one energy storage element, in accordance with at least one aspect of the present disclosure.

Each energy cell 108 comprises an energy storage element 112 controlled by an element management unit 114 comprising unique digital and/or analog control circuits. The combination of the energy storage element 112 and the element management unit 114 forms a single managed cell control unit 116 as described below in connection with FIG. 2. In one aspect, a temperature sensor 113 may be located as close as possible to the energy storage element 112 or formed integrally with the energy storage element 112. The temperature sensor 113 provides the temperature "t" of the energy storage element to the element management unit 114, for example, FIG. 2 illustrates a cell control unit 116 configured to independently control and manage one energy storage element 112, in accordance with at least one aspect of the present disclosure. In one aspect, the scalable and manageable energy storage system 100 may comprise an array of cell control units 116, each of which independently controls and manages one or more than one energy storage element 112. This may be done by optimizing and controlling the voltage and current of the energy storage elements 112 individually, independently from the external voltage/current variations. The energy storage element 112 may comprise a temperature sensor to measure the temperature of the energy storage element 112.

The energy storage element 112 comprises an internal energy rail 118a, 118b to connect the positive and negative terminals of the energy storage element 112 to the control circuit 120, which may comprise a general purpose processor or digital logic circuit that executes dedicated cell control firmware. One function of the cell control unit 116 (CCU) is to isolate the internal energy rail 118a, 118b (IER) of the energy storage element 112 (ESE) from the rest of the energy storage system 100, with the purpose of optimizing charge/discharge operations to extending energy storage element 112 life cycle, rate of charge/discharge, manage dynamic load/charge profiles, etc. In the illustrated example, one energy rail 118a is the positive energy rail and the other energy rail 118b is the negative energy rail. In one aspect, the temperature sensor 113 is located as close as possible to the energy storage element 112 or formed integrally with the energy storage element 112 to provide the temperature "t" of the energy storage element 112 to the control circuit 120.

The control circuit 120 comprises a digital control circuit comprising a processor or multiple processors executing embedded firmware, memory, nonvolatile storage to store pertinent data and processor instructions, digital logic circuits, and analog circuits. In one aspect, the control circuit 120 comprises a processor and memory configuration as described in connection with FIGS. 13 and 14 to execute firmware and manage the cell control unit 116. The digital control circuit functions include control the voltage regulators, switches, temperature sensor, voltage and current measurements circuits, implement the cell communication protocol 128 to manage the state of charge and state of life of the energy storage element 112. The control circuit 120 comprises digital and/or analog circuits coupled between the internal energy rails 118a, 118b and cell energy rails 122a, 122b (CER). In the illustrated example, one output energy rail 122a is the positive output energy rail and the other energy rail 122b is the negative energy rail. Accordingly, the cell control unit 116 can perform both digital and analog functions to manage one or more than one energy storage element 112 state of charge and state of life.

With reference now also to FIG. 1, the cell communication protocol 128 provides the mechanism for each individual cell control unit 116 to communicate with the power bank management unit 110. The cell communication protocol 128 also provides a way for the power bank management unit 110 to discover the location and neighbors of a cell control unit 110 within its group 106. Multicast, broadcast, and unicast messages can be exchanged between the power bank management unit 110 and the cell control units 116 using the cell communication protocol 128. It also provides a way of time-synchronization of the energy cells 108 within the power bank 104 with the power bank control unit 110.

Back to FIG. 2, the control circuit 120 comprises firmware modules and algorithms to control the regulators and energy rail switches 124 to manage the state of charge and state of life of the energy storage element(s) 112 during a charge cycle and the voltage/current of the cell energy rail 122a, 122b during a discharge cycle. The algorithms also can be tailored to various battery technologies.

The control circuit 120 optimizes charge/discharge operations and extends the life cycle, rate of charge/discharge, manages dynamic load/charge profiles, of the energy storage element 112 by using run-time adjustable regulators such as buck, boost, buck/boost DC/DC converters, DC/AC converters, AC/AC converters, current source, low dropout (LDO) regulator, etc. The control circuit 120 is separately powered through a control power rail 130 (CPR) supplied by the control power source in the power bank 104. Providing a separate power source for the control circuit 120 provides independent functionality of the energy cell 108 (FIG. 1) regardless of the state of charge of the energy storage elements 112 at all times.

As described in more detail with reference to FIG. 4, the control circuit 120 may comprise an input regulator and an output regulator. In one aspect, the cell energy rail 122a, 112b to internal energy rail 118a, 118b voltage and current regulators are programmable high efficiency power regulators that regulate the voltage and current on the external energy rails 122a, 122b to the internal energy rail 118a, 118b. The regulators control the voltage and current seen by each of the energy storage elements 112 under their control. Internal energy rail 118a, 118b to cell energy rail 122a, 122b voltage and current regulators are programmable high efficiency power regulator that regulate the voltage and current on the internal energy rails 118a, 118b to the cell energy rail 122a, 122b. The control circuit 120 comprises voltage and current measurement circuits to measure the current and voltage on the internal energy rail 118a 118b, the cell energy rail 122a, 122b, and the external energy rails 126, for example.

The input regulator is employed during a charge cycle of the energy storage element 112 and the output regulator is employed during a discharge cycle of the energy storage element 112. As described above, the input/output regulators isolate the internal energy rails 118a, 118b of the energy storage element 112 from the rest of the energy storage system 100. During a charge cycle, the input regulator optimizes the voltage/current at the internal energy rail 118a, 118b of the energy storage element 112. During a discharge cycle, the output regulator generates the desired voltage/current at the output energy rail 122a, 122b. The control circuit 120 also may employ electronic programmable power rail switches to connect/disconnect the internal energy rail 118a, 118b from the input regulator and to disconnect/connect the internal energy rail 118a, 118b from the output regulator. In one aspect, the input and output regulators can be implemented as a single regulator and may be the same regulator.

In one aspect, the cell control unit 116 also may comprise additional electronic energy rail switches 124 for connecting/disconnecting the output cell energy rail 122a, 112b to the external energy rails 126 (EER). In one aspect, the external energy rails 126 may be connected to a dynamic wiring system that allows the energy storage element 112 to be connected to one of a plurality of dynamic wiring topologies (DWT1, DWT2, DWTn) supported in the power bank 104 (FIG. 1) through the output energy rail 122a, 122b to be chosen at run time using the energy rail switches 124 at the energy storage element 112 level. Topology refers to configuration of serial/parallel connections of energy storage elements 112 to change the overall current/voltage of the power bank 104. The energy rail switches 124 are programmable power switches that can connect or disconnect the cell energy rail 122a, 122b to/from the group or external energy rails 126, and/or connect/disconnect the internal energy rail 118a, 118b from the input/output regulators such as, for example, regulator 302 and regulator 304 shown in FIG. 4. Switching from the dynamic wiring topology requires time-synchronization between all cell control unit 116 that can be achieved via the cell communication protocol 128 and uses the energy rail switches 124 under control of the firmware executed by the control circuit 120 or digital circuit 308.

Using the dynamic wiring system combined with the aforementioned regulators and energy rail switches 124 allows real time coarse and fine configurations that can enable the energy storage system 100 to respond to a large dynamic range of charge/discharge profiles in real time with very low latency. Coarse changes may be accomplished by switching to different wiring topology using the dynamic wiring system and fine control accomplished by using regulators.

Since the current/voltage control is performed at the energy storage element 112 level, the regulators and energy rail switches 124 used to accomplish this functionality need to be rated for relatively low current and voltage and lower latency, which makes it more efficient and cost effective than the alternative of regulating the voltage and current on the output of the group/bank as it is currently implemented in existing energy storage systems. For example, a CMOS-based electronic switch is orders of magnitude more reliable and cost-effective when it is designed for 5V/10 A versus 100V/200 A. 18. Accordingly, the energy rail switches 124 that switch the external energy rails 126 to achieve a dynamic wiring system do not need to be rated for the typical high electrical current that a group energy rail expects since the external energy rails 126 sees only the electrical current of a single energy storage element 112.

In one aspect, each energy storage element 112 is managed by dedicated firmware executed by the control circuit 120 that optimizes and manages the regulators and the energy rail switches 124 depending on system mode of operation, energy storage element 112 state of charge, energy storage element 112 state of life, or other parameters to maximize storage element life cycle, rate of charge/discharge, safety, or other desired metrics.

In one aspect, the power bank 104 (FIG. 1) also may have dedicated firmware that manages the aggregation of energy to/from the energy storage elements 112, and can coordinate dynamic wiring system and the energy storage element regulators/switches in response to the dynamics of external charge/discharge profiles. These functions may be implemented in the power bank management unit 110 (FIG. 1).

In one aspect, coordination between the power bank management unit 110 (FIG. 1) firmware and the cell control unit 116 firmware may be achieved using a cell communication protocol rails 128 (CCP) that allows control and status message exchange using broadcast/multicast/unicast messages. To prevent or minimize the energy storage system-level voltage/current transients each active energy storage element 112 starts/stops powering the external energy rails 126 at the same time. Accordingly, in one aspect the cell communication protocol 128 provides a time-synchronization mechanism across the system to provide coherency.

With reference now to FIGS. 1 and 2, each power rack 102 comprises one or more power banks 104 interconnected by rack energy rails and communicate with each other over a power bank 104 communication protocol. Each power bank 104 also comprises a control power source, a power bank management unit 110, groups 106 of energy cells 108 comprising cell control units 116 that communicate with each other over a cell communication protocol 128. Each cell control unit 116 is coupled to the power bank 104 through external energy rails 126, the control power rail 130 to power the control circuit 120, and a dynamic wiring system. Groups 106 of energy cells 108, each comprising a cell control unit 116, may be dynamically connected in parallel, series, combinations of parallel and series, in phase relation, or combinations thereof. Bank energy rails connect to group energy rails using a dynamic wiring system. The bank energy rails carry the electric energy coming in and out of the power bank 104.

The cell control units 116 communicate over the cell communication protocol 128 and may be dynamically coupled to the group external energy rails 126 or the control power rail 130 during run-time. Each cell control unit 116 comprises one or more than one energy storage element 112, an element management unit 114, an internal energy rail 118*a*, 118*b*, a cell energy rail 122*a*, 122*b*, a control power rail 130, and a cell communication protocol 128. Each cell control unit 116 comprises a digital/analog control block shown as a control circuit 120 comprising digital and analog circuits for regulating charging/discharging functions, measuring energy storage element 112 temperature, voltage and current of internal and external energy rails 122*a*, 122*b*, 126, internal to external energy rails voltage and current regulators, external to internal energy rail voltage and current regulators, and one or more energy rail switches 124.

A group of cell control units 116 share the same group energy rails and may be connected in parallel to all the external energy rails 216 from each energy cell 108. The number of group energy rails matches the number of external energy rails 126 for each cell control unit 116.

In some aspects, one or more than one dynamic wiring topology can be selected for state of charge balancing of the energy cells 108 across the energy storage system 100. This dedicated balancing wiring topology connects to both external charge and discharge energy rails of each energy cell 108. This allows the power bank management unit 110 to redistribute the energy by providing a command, for example, to energy cells 108 with a higher state of charge to connect to the discharge energy rail of the balancing wiring topology and energy cells 108 with a lower state of charge to connect to the charge energy rail of this topology. This will achieve a healthier overall state of charge for the energy storage elements 112 throughout the energy storage system 100. In some aspects, the dynamic wiring system can be used to switch phases between negative and positive terminals, when the positive of one external energy rail connects to negative terminal of the other and vice versa, this could allow the regulator to generate/receive negative external voltage in respect of its own voltage. In other aspects, each energy cell 108 can have access to external (shared) resistor to enable full discharge in case of energy storage element 112 state of charge recalibration.

Figure 3:
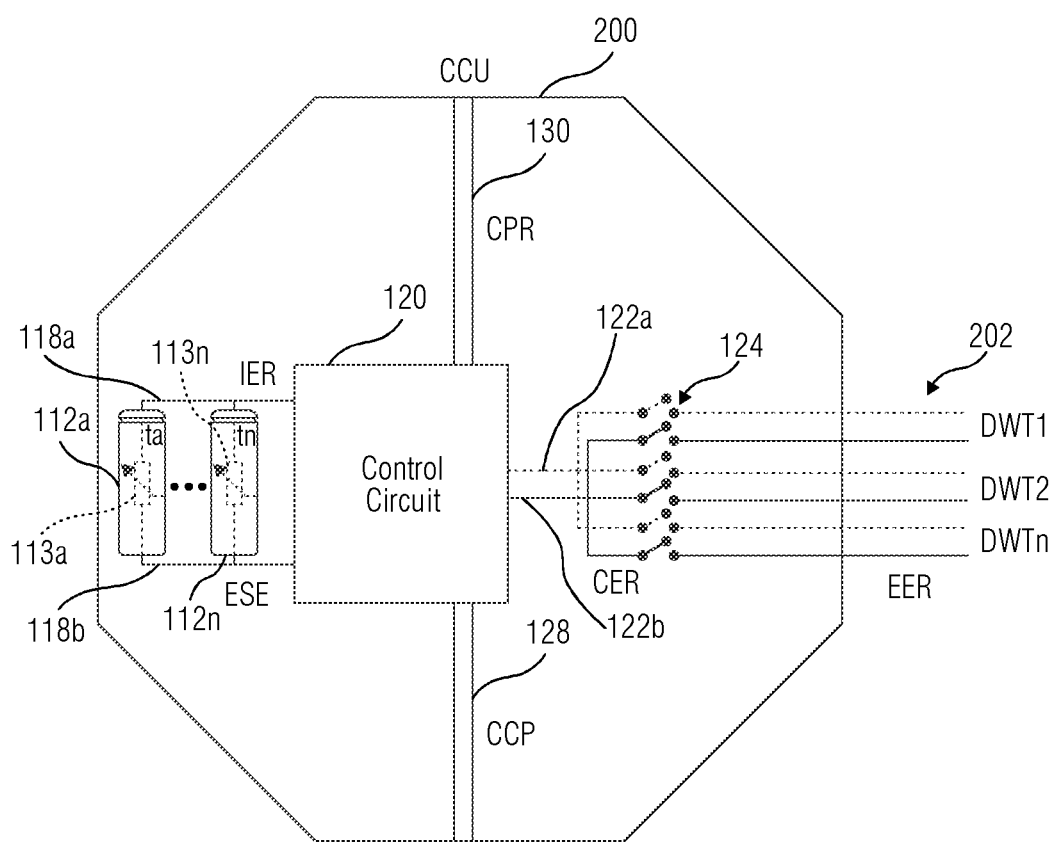
FIG. 3 illustrates a cell control unit configured to independently control and manage two or more energy storage elements, in accordance with at least one aspect of the present disclosure.

FIG. 3 illustrates a cell control unit 200 configured to independently control and manage two or more energy storage elements 112*a*, 112*n*, in accordance with at least one aspect of the present disclosure. Functionally, the cell control unit 200 is similar to the cell control unit 116 described in FIG. 1. As previously described, in one aspect, the control circuit comprises a processor and memory configuration as described in connection with FIGS. 13 and 14 to execute firmware and manage the cell control unit 200. In one aspect, each of the energy storage elements 112*a/n* may comprise a temperature sensor 113*a/n* located as close as possible to the energy storage element 112*a/n* or formed integrally with the energy storage element 112*a/n* to provide the temperature "ta/tn" of the energy storage element 112*a/n* to the control circuit 120.

Figure 4:
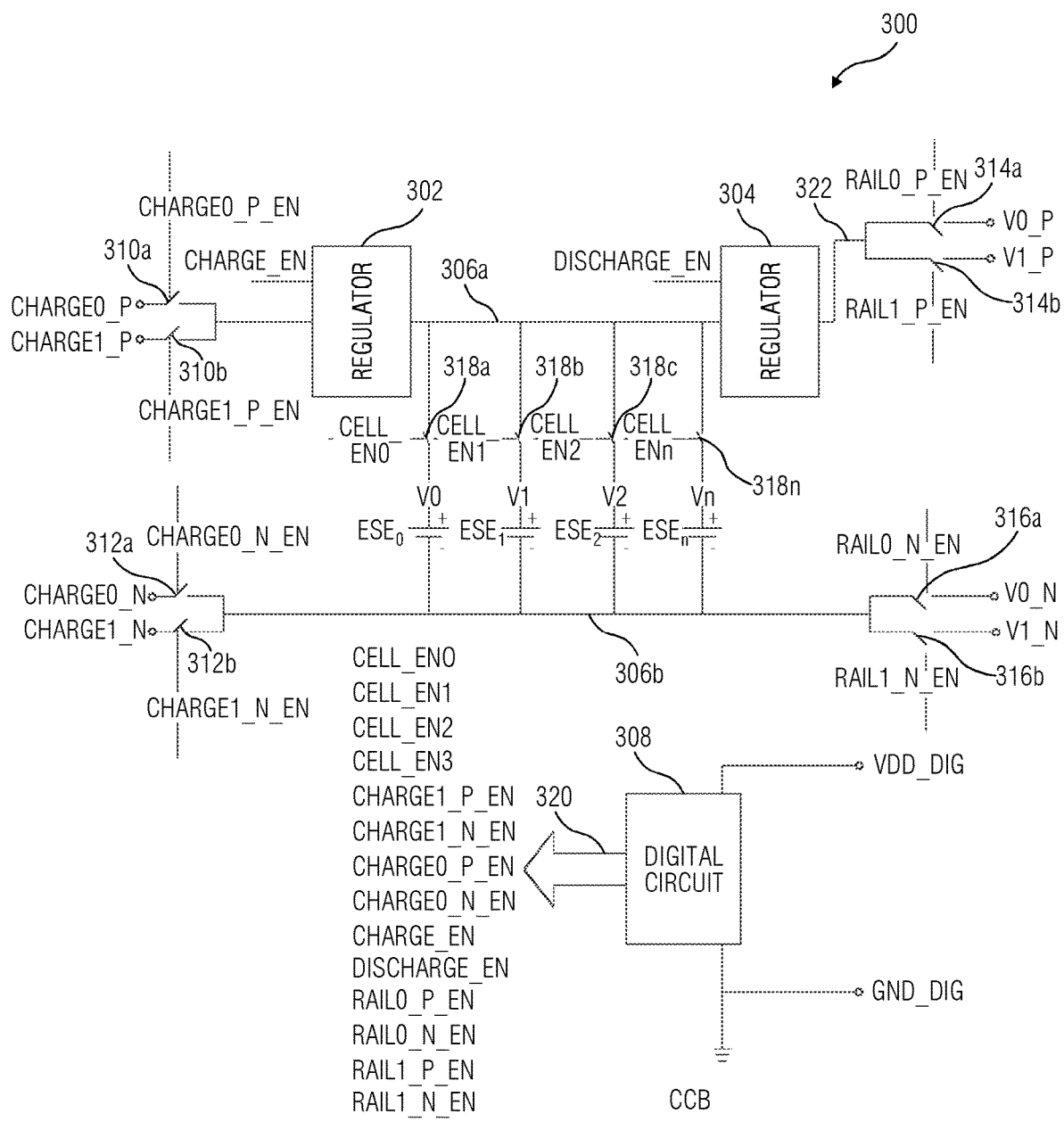
FIG. 4 is a block diagram of a cell control unit, in accordance with at least one aspect of the present disclosure.

FIG. 4 is a block diagram of a cell control unit 300, in accordance with at least one aspect of the present disclosure. The cell control unit 300 comprises an input charge regulator 302 and an output discharge regulator 304. The input regulator 302 is used during the charge cycle and the output regulator 304 is used during the discharge cycle. In other aspects, the input regulator 302 may comprise a plurality of regulators and the output regulator 304 may comprise a plurality of regulator. In yet other aspects, the charge and discharge functions may be implemented by a single regulator. The input and output regulators 302, 304 are run-time adjustable and may be implemented as buck, boost, buck/boost DC/DC converters, DC/AC converters, AC/AC converters, current sources, low dropout regulators, among other types of regulators.

A plurality of energy storage elements ESE0, ESE1, ESE2, . . . ESEn are coupled between the input and output regulators 302, 304. The positive ends of the energy storage elements ESE0-ESEn are coupled to a positive internal energy rail 306*a* and the negative ends of the energy storage elements ESE0-ESEn are coupled to the negative internal energy rail 306b. The positive internal energy rail 306a is coupled each of the energy storage elements ESE0-ESEn through corresponding switches 318a, 318b, 318c, . . . 318n.

Figure 9:
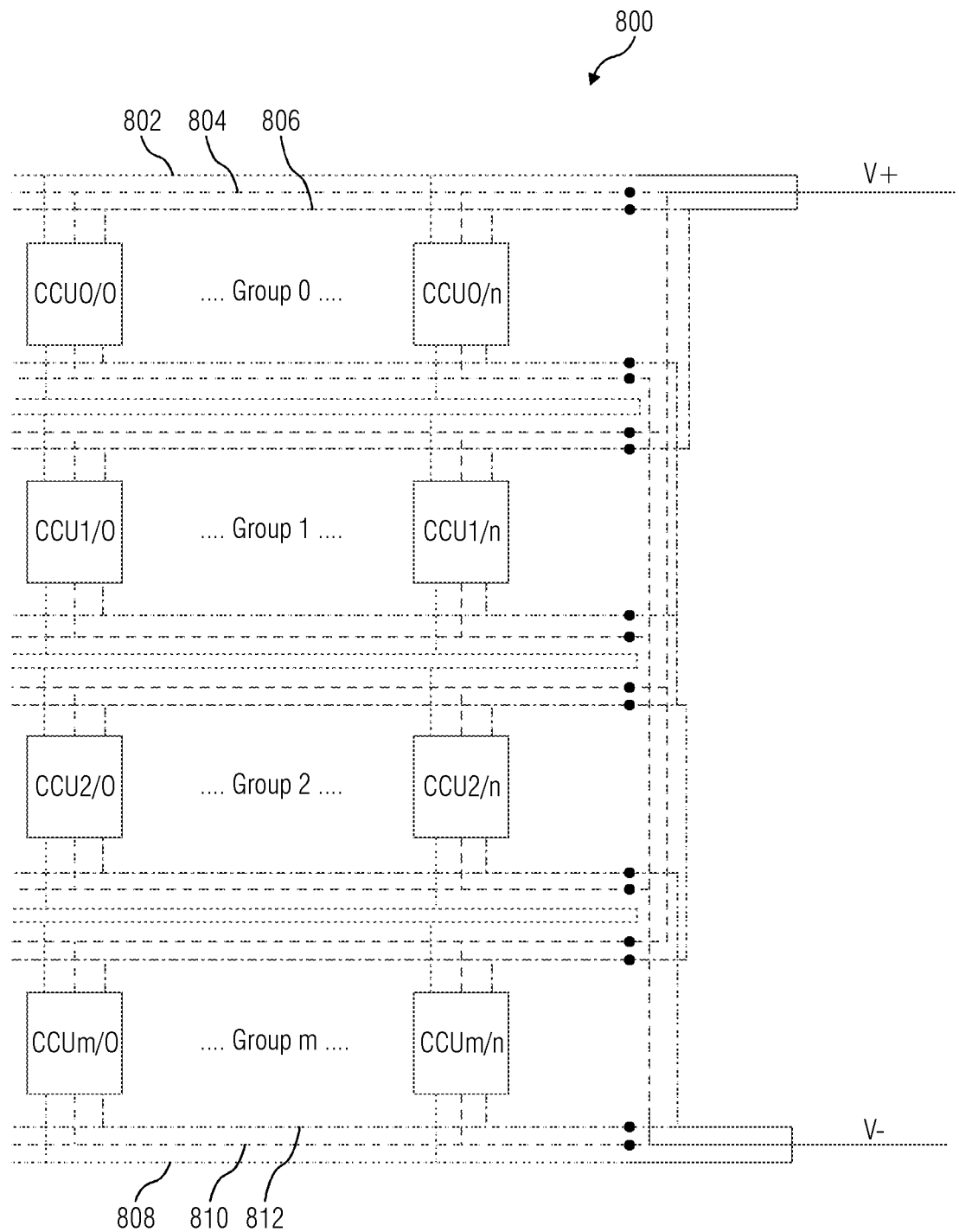
FIG. 9 is a high-level diagram of a power bank comprising multiple cell groups connected using a dynamic wiring system (DWS), in accordance with at least one aspect of the present disclosure.

A first set of input switches 310a, 310b couple the positive charging rails CHARGE_0_P/CHARGE_1_P of the charging source to the input regulator 302 and a first set of energy rail switches 314a, 314b couple the cell energy rail 322 output of the output regulator 304 to the positive external energy rails V0_P/V1_P, which may be coupled to a load or to other cell control units, as illustrated in FIG. 9, for example. A second set of input switches 312a, 312b couple the negative internal energy rail 306b to the negative charging rails CHARGE_0_N/CHARGE_1_N of the charging source. A second set of energy rail switches 316a, 316b couple the negative internal energy rail 306b to the negative external energy rails V0_N/V1_N, which may be coupled to the load or to other cell control units, as illustrated in FIG. 9, for example.

A digital control circuit 308 is separately powered through a control power rail VDD_DIG, GND_DIG. As previously described, in one aspect, the control circuit 308 comprises a processor and memory configuration as described in connection with FIGS. 13 and 14 to execute firmware and manage the cell control unit 300. Various output lines 320 of the digital control circuit 308 are coupled to the enable inputs CHARGE_EN/DISCHARGE_EN of the input and output regulators 302, 304 to enable and disable the charging and discharging functions of the regulators 320, 304. Other output lines 320 of the digital control circuit 308 are coupled to the enable inputs CHARGE_0_P_EN/ CHARGE_1_P_EN of the first set of input switches 310a, 310b and the enable inputs CHARGE_0_N_EN/ CHARGE_1_N_EN of the second set of input switches 312a, 312b to control the ON/OFF state of the switches 310a, 310b, 312a, 312b to connect/disconnect the charging source coupled to the positive and negative charging rails CHARGE_0_P/CHARGE_1_P and CHARGE_0_N/ CHARGE_1_N to the input charge regulator 302. Other output lines 320 of the digital control circuit 308 are coupled to the enable inputs RAIL_0_P_EN/RAIL_1_P_EN of the first set of energy rail switches 314a, 314b and the enable inputs RAIL_0_N_EN/RAIL_1_N_EN of the second set of energy rail switches 316a, 316b to control the ON/OFF state of the energy rail switches 314a, 314b, 316a, 316b to connect/disconnect the cell energy rail 322 of the output discharge regulator 304 to the positive external energy rails V0_P/V1_P. Other output lines 320 of the digital control circuit 308 are coupled to the enable inputs CELL_EN0, CLL_EN1, CELL_EN2, . . . CELL_ENn of the energy storage elements ESE0, ESE1, ESE2, . . . ESEn to control the charging and discharging cycles of the energy storage elements ESE0, ESE1, ESE2, . . . ESEn in a coordinated synchronized process as described hereinbelow.

In one aspect, the cell control unit 300 also includes measurement circuits to monitor voltage/current on each of the energy storage elements ESE0, ESE1, ESE2, . . . ESEn and the cell energy rails 322. The voltage of each energy storage elements ESE0-ESEn is indicated as $V_0$, $V_1$, $V_2$, . . . $V_n$.

During the charge cycle, the cell control unit 300 monitors currents/voltages on each of the energy storage elements ESE0, ESE1, ESE2, . . . ESEn and the cell energy rails 306a. The cell control unit 300 also could monitor the temperature of each of the energy storage elements ESE0, ESE1, ESE2, . . . ESEn, and adjusts the input regulator(s) 302 based on these measurements and energy storage elements ESE0, ESE1, ESE2, . . . ESEn calibration information, state of charge, state of life, external charging supply dynamics, and other parameters to control the rate of charge into the energy storage elements ESE0, ESE1, ESE2, . . . ESEn.

During the discharge cycle, the cell control unit 300 adjust the output regulator(s) 304 based on the system level requirements, current and voltages at different rails, energy storage element ESE0, ESE1, ESE2, . . . ESEn temperature, state of charge, state of life, factory calibration and other parameters to extend the life of each of the energy storage elements ESE0, ESE1, ESE2, . . . ESEn, guarantee safety and provide a response to dynamic load conditions or output the desired real-time voltage/current.

In a standby state, the cell control unit 300 isolates the energy storage elements ESE0, ESE1, ESE2, . . . ESEn by disconnecting the energy rail switches 314a, 314b, 316a, 316b from the external energy rails V0_P, V1_P, V0_N, V1_N and disabling the input and output regulator(s) 302, 304. The standby state allows to minimize leakage, while maintaining fast response ability to move to charging/discharging states.

Also, in one aspect, the cell control unit 300 may be set in a low power storage mode (deep sleep) by disconnecting all the energy rail switches 314a/b, 316a/b, 318a/b/c/n from the external energy rails V0_P, V1_P, V0_N, V1_N, disabling the input and output regulator(s) 302, 304, and powering down most of the digital logic circuits of the digital circuit 308. This eliminates most leakage and require a longer time to move to standby mode.

The control functions within the cell control unit 300 may be implemented in the digital circuit 308 logic that may include a general purpose processor that executes dedicated cell control firmware. In some aspects, the digital circuit 308 may comprise more than one processor or no processor and use digital logic instead, such as field programmable gate arrays (FPGA), programmable logic devices (PLD), discrete logic, or analog circuits, or combinations thereof.

The firmware/digital logic runs a program (e.g., executes a set of machine executable instructions) to optimize charge/ discharge operations by collecting internal and external voltage, current, and temperature of each of the energy storage elements ESE0, ESE1, ESE2, . . . ESEn and uses these measurements in conjunction with stored energy storage element-specific calibration data to control the input/ output regulators 302, 304. The firmware/digital logic also communicates with the power bank management unit 110 (FIG. 1) to coordinate bank-wide operations. For example, when the power bank management unit 110 during a discharge cycle wants to adjust the total external voltage of the bank, the power bank management unit 110 can issue a command to all the energy storage elements ESE0, ESE1, ESE2, . . . ESEn, energy cells 108, or cell control unit 300 to adjust the input/output regulators 302, 304 accordingly.

With reference now to FIGS. 1-4, in some aspects, the energy cells 108 comprising an energy storage element 112 controlled by an element management unit 114 (FIG. 1) together forming a single managed cell control unit 116 (FIG. 2), the cell control unit 200 (FIG. 3), and the cell control unit 300 (FIG. 4) may be integrated into groups 106. All the energy cells 108 in the group 106 may be connected in parallel to allow redundancy and avoid a single point of failure, e.g., the corresponding cell external energy rails 126 (202, V0_P, V1_P) for each energy cell 108 are connected. The group 106 may contain a number of energy cells 108, which may vary depending on mechanical/electrical/system design constraints of a particular implementation.

Figure 10:
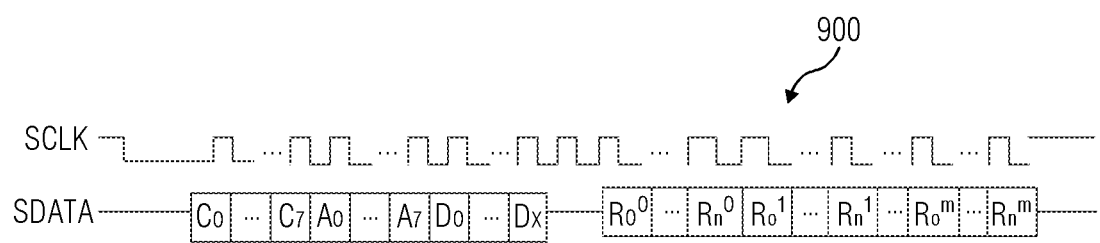
FIG. 10 illustrates a cell communication protocol message, in accordance with at least one aspect of the present disclosure.

With reference now to FIGS. 1-4 and 10, the cell communication protocol is a message exchange mechanism between the power bank management unit 110 (Master) and cell control units 116, 200, 300 (Slaves). It allows the power bank management unit 110 to send a broadcast message to all the energy cells 108 within the power bank 110 or unicast message to an individual energy cell 108. As shown in FIG. 10, a cell communication protocol message 900 exchange comprises command C ($C_0$-$C_7$), address A ($A_0$-$A_7$), data D ($D_0$-$D_7$), and response R ($R_0^0$-$R_n^0$, $R_0^1$-$R_n^1$, $R_0^m$-$R_n^m$) portions. Data R and/or response R portions are optional. The command C, A and data D portions are sent by the master (power bank management unit 110) and the response R portion is sent by the slaves (cell control units 116, 200, 300). The response R portion of the message is time-divided between the slaves, where each slave is assigned a "time-slot" within the response R portion of the message in which it is allowed to transmit its response.

With reference now to FIGS. 2-4 and 10, the cell communication protocol messages 900 include various commands to set the mode of operation of the slaves (e.g., charge/discharge/fast charge/fast discharge/discharge voltage/selected external energy rails, etc.); get the status of the slave (e.g., the state of charge of the energy cell, etc.); synchronize the slaves local clock with the master's clock, change the state of the slave (e.g., Active<=Standby) and more.

Still with reference to FIGS. 2-4 and 10, as the cell communication protocol message 900 is received by a slave it is time-stamped with slave's local clock. The master also has a time-stamping mechanism for any outgoing message 900 with master's local clock. The synchronization message contains the master's time-stamp. Upon receiving the synchronization message, a slave calculates its local clock drift with respect to the master's clock and determines how to keep it synchronized with the master's clock. For example, when the slave's local clock is 0.1% faster than the master's clock, the slave needs to divide its timer value by 1.001 to keep it synchronized with the master's clock, e.g., 1 million master clock cycles is equal to 999,001 slave clock cycles. In some aspects, the dedicated communication line can be used for the purpose of synchronization, in addition to or instead of the mechanism described above.

Still with reference to FIGS. 2-4 and 10, in some aspects, the cell communication protocol can be implemented using two wires: clock SCLK and serial data SDATA (FIG. 10). The clock SCLK is driven by the master and is received by all the slaves. Serial data SDATA is a bidirectional signal that is driven by the master during the command C, A and data D portions of the message 900 and by the slaves during the response R portion of the message 900. In some aspects, the clock SCLK and serial data SDATA signals can be single-ended and in the other aspects can be differential. It is also possible to implement the clock SCLK and the serial data SDATA signals per cell group 106.

With reference now to FIGS. 1-4, groups 106 of energy cells 108 within the power bank 104 can be dynamically configured to be connected in parallel or serial or any predefined combinations of parallel/serial topologies. The group 106 connection topology is selected by cell control unit 116, 200, 300 firmware/digital logic at run time.

With reference now to FIGS. 2-4, to achieve this dynamic configuration each cell control unit 116, 200, 300 is connected to multiple external energy rails 126, 202, V0_P, V1_P, V0_N, V1_N, and can dynamically select which rail to connect to using programmable energy rail switches 124, 310a/b, 312a/b, 314a/b, 316a/b.

With reference to FIGS. 2-4, the programmable energy rail switches 124, 310a/b, 312a/b, 314a/b, 316a/b at the energy cell 108 level allows to avoid using high-current rated switches that are more expensive, less efficient and have longer switching time and larger transient. By way of example, For example, a CMOS-based electronic switch is orders of magnitude more reliable and cost-effective when it is designed for 5V/10 A versus 100V/200 A.

With reference now to FIGS. 1-4, in one aspect a dynamic wiring system is provided that employs multiple pre-wired topologies (DWTn) that connect each cell group 106 in n different ways (Parallel/Serial) and allows the system to choose at run time which topology is active. The dynamic wiring system comprises multiple dynamic wiring topologies that connect group energy rails in various parallel/serial configurations. Each group energy rail belongs to a single dynamic wiring topology and can be selected at run time by the cell control units 116, 200, 300 which allows the system 100 (FIG. 1) to support a wide dynamic range of voltage/current profiles.

Still with reference to FIGS. 1-4, as shown in FIGS. 2 and 3, there are multiple external energy rails 126, 202, V0_P, V1_P, V0_N, V1_N that at any moment connect the energy cell 108 to one of many (n) dynamic wiring topologies (DWT1 . . . n), supported in the power bank 104.

Still with reference to FIGS. 1-4, the topology switch can be performed by each individual energy cell 108 in a synchronous manner by first simultaneously disconnecting from all the external energy rails 126, 202, V0_P, V1_P, V0_N, V1_N and then simultaneously connecting to the desired external energy rails 126, 202, V0_P, V1_P, V0_N, V1_N to prevent having two or more external energy rails 126, 202, V0_P, V1_P, V0_N, V1_N active (hot) at the same time.

Combining the per energy cell 108 regulated input/output (input during the charge cycle and output during the discharge cycle) and DWS allow the system to achieve a very wide range of power profiles in both charge and discharge states, and ability to change the profile at run time with a very low latency (e.g., fast charge, different power sources, driving motor that have wide range of torque/speed in time).

The DWS also avoids the need for high current/voltage switches at the power bank 104 level, reducing cost, increase scalability and avoiding a single point of failure. In some aspects, the DWS also may be employed to switch negative/positive voltages, by connecting the positive terminal of rail A to the negative terminal of rail B and vice versa, when the energy cells 108 switch from one external energy rail 126, 202, V0_P, V1_P, V0_N, V1_N to the other their regulators 302, 304 still generate/receive positive voltage while it will be negative voltage from overall system point of view.

Examples of four different wiring topologies that can be changed at run time are described with reference to FIGS. 5-8.

Figure 5:
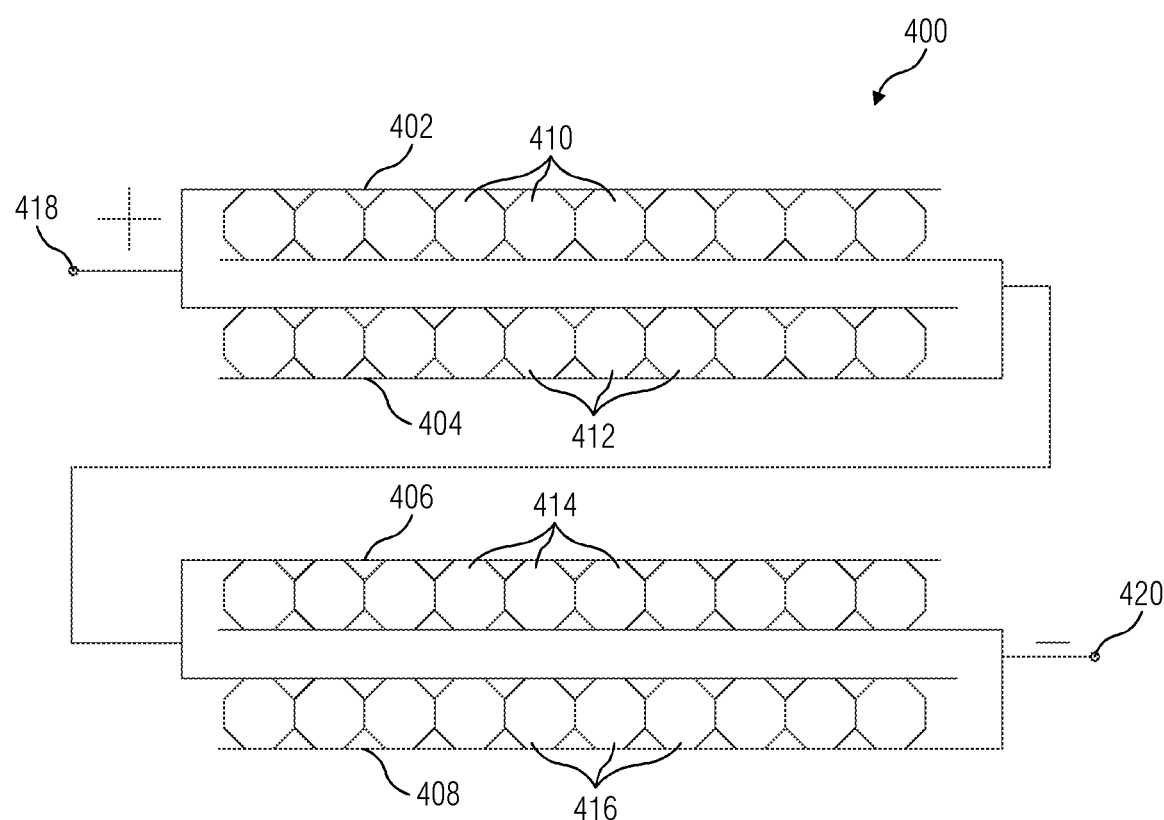
FIG. 5 illustrates a parallel-series dynamic wiring topology (DWT1), in accordance with at least one aspect of the present disclosure.

FIG. 5 illustrates a parallel-series dynamic wiring topology 400 (DWT1), in accordance with at least one aspect of the present disclosure. The DWT1 topology 400 comprises four groups 402, 404, 406, 408 of energy cells 410, 412, 414, 416 wired into two sets connected in series, with two groups of cells connected in parallel within each set. For example, groups 402, 404 are connected in parallel to form the first set and groups 406, 408 are connected in parallel to form the second set. The first and second sets are connected in series between the positive (+) terminal 418 and the negative (−) terminal 420.

Figure 6:
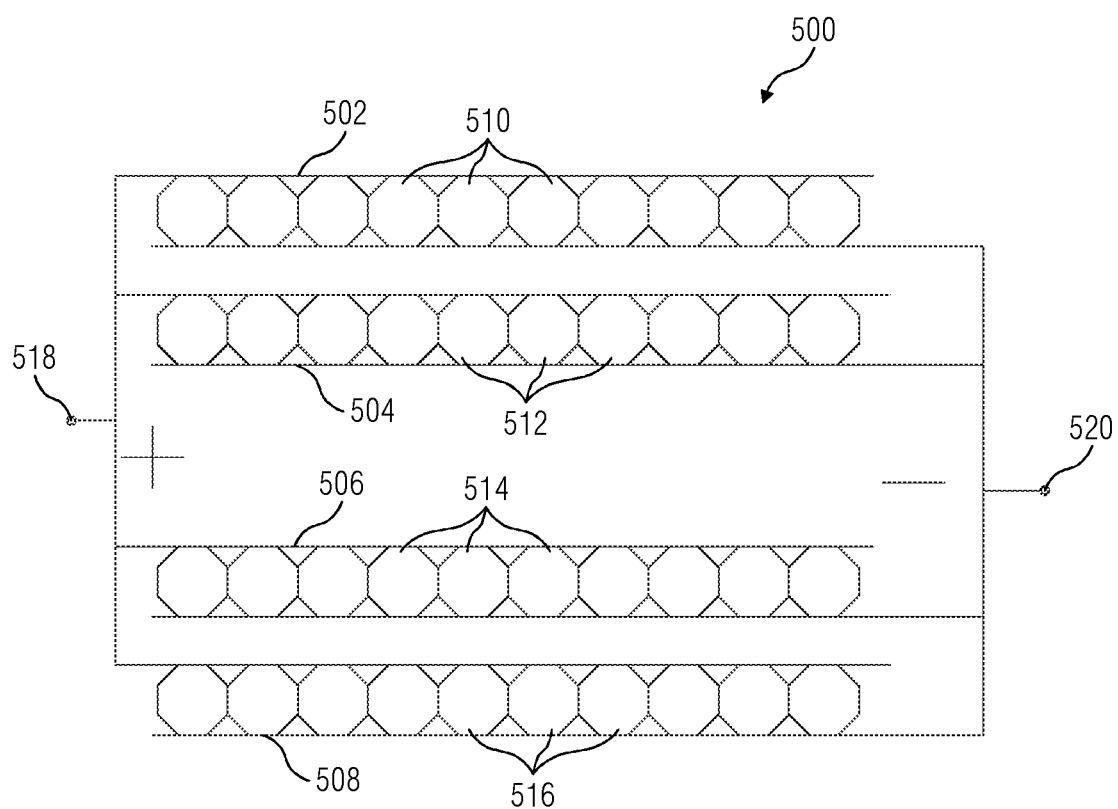
FIG. 6 illustrates a parallel dynamic wiring topology (DWT2), in accordance with at least one aspect of the present disclosure.

FIG. 6 illustrates a parallel dynamic wiring topology 500 (DWT2), in accordance with at least one aspect of the present disclosure. The DWT2 topology 500 comprises four groups 502, 504, 506, 508 of energy cells 510, 512, 514, 516 connected in parallel between the positive (+) terminal 518 and the negative (−) terminal 520. With reference now also to FIG. 1, when the power bank 104 is requested to provide maximum current, the power bank management unit 110 will send a request to adjust the energy cell 108 output regulator to the desired voltage, and switch to the dynamic wiring topology 500 (DWT2) that connects all energy cells 108 in parallel to increase the power bank 104 output current.

Figure 7:
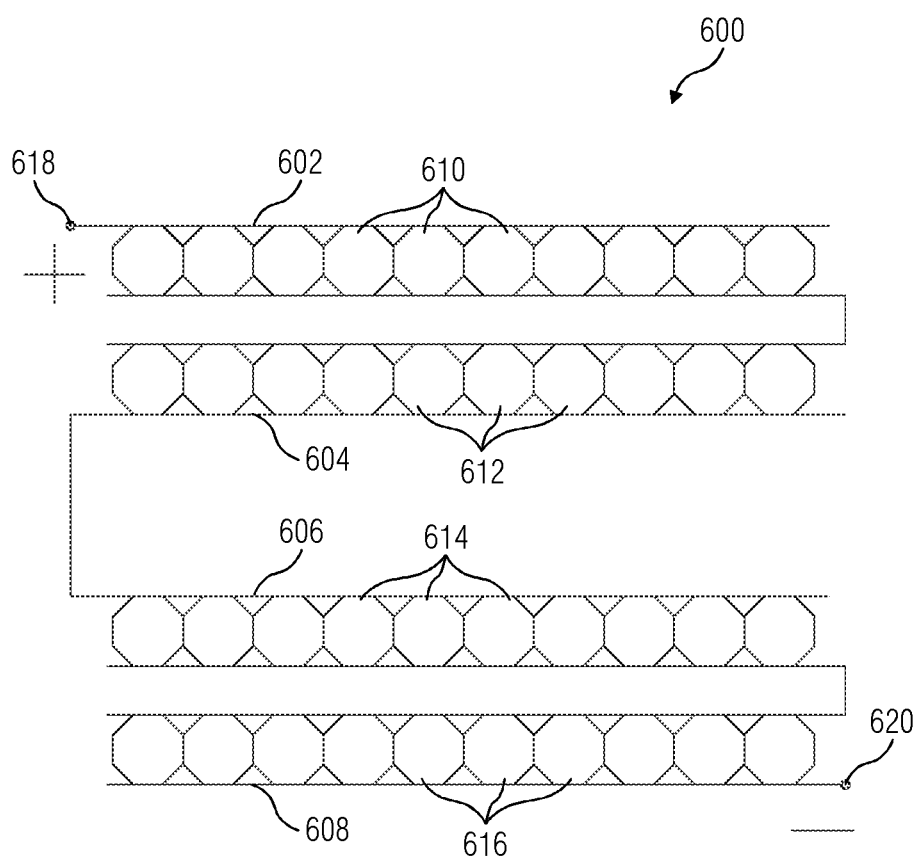
FIG. 7 illustrates a series dynamic wiring topology (DWT3), in accordance with at least one aspect of the present disclosure.

FIG. 7 illustrates a series dynamic wiring topology 600 (DWT3), in accordance with at least one aspect of the present disclosure. The DWT3 topology 600 comprises four groups 602, 604, 606, 608 of energy cells 610, 612, 614, 616 connected in series between the positive (+) terminal 618 and the negative (−) terminal 620. With reference now also to FIG. 1, when the power bank 104 is requested to provide maximum voltage, the power bank management unit 110 will send a request to adjust the energy cell 108 output regulator(s) to the desired voltage, and switch to the dynamic wiring topology 600 (DWT3) that connects all energy cells 108 in series to increase the power bank 104 output voltage.

Figure 8:
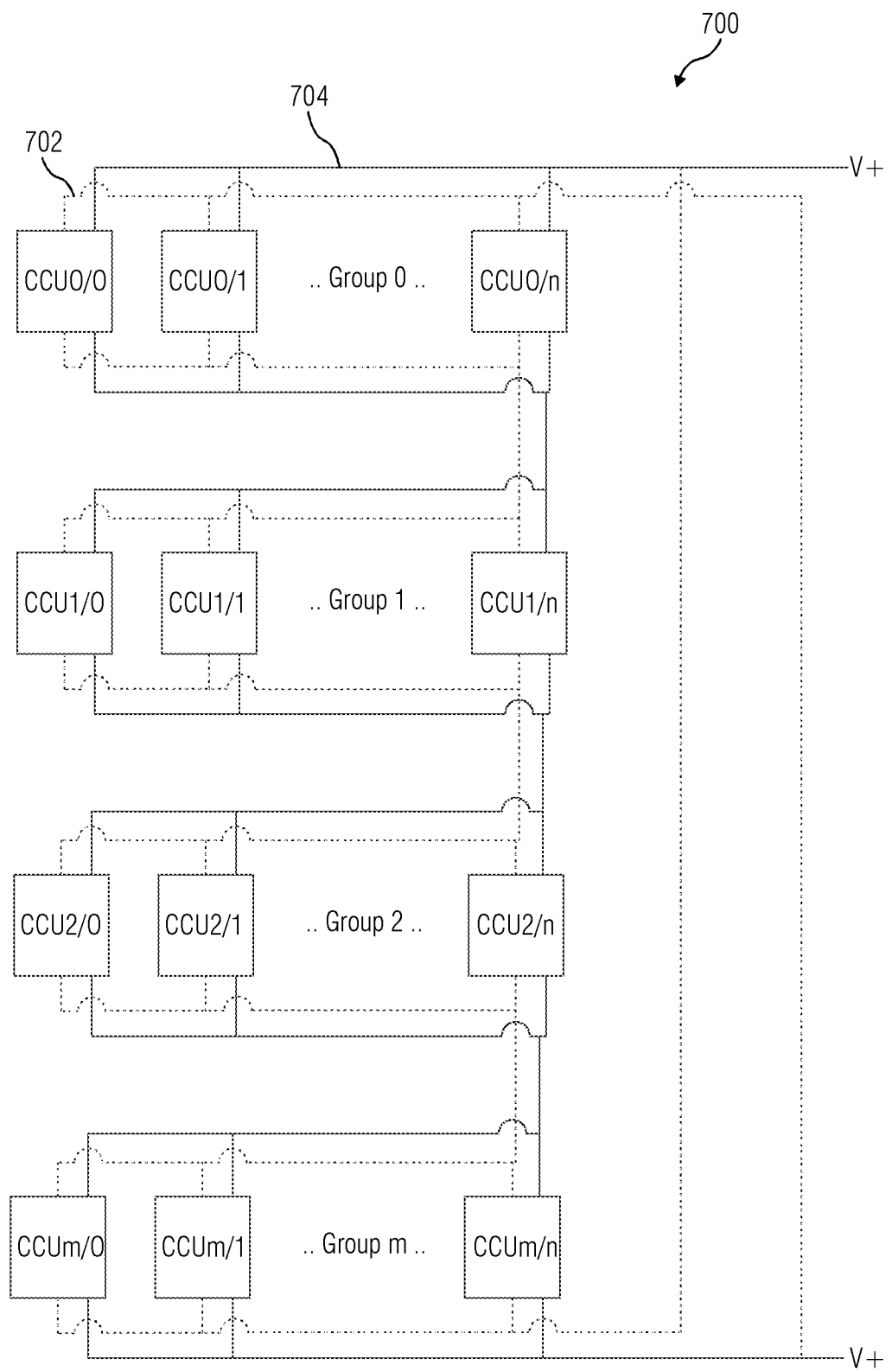
FIG. 8 illustrates a phase inverting dynamic wiring topology (DWT4) to switch phases between negative and positive, in accordance with at least one aspect of the present disclosure.

FIG. 8 illustrates a phase inverting dynamic wiring topology 700 (DWT4) to switch phases between negative and positive, in accordance with at least one aspect of the present disclosure. The non-inverting wiring topology 704, shown in solid line, is connected to rail 1 of each cell control unit CCU0/1 to CCU0/n, CCU1/1 to CCU1/n, CCU2/1 to CCU2/n, CCUm/1 to CCUm/n and the inverting wiring topology 702, shown in dashed line, is connected to rail 2 of each cell control unit CCU0/1 to CCU0/n, CCU1/1 to CCU1/n, CCU2/1 to CCU2/n, CCUm/1 to CCUm/n. Either topology connects the groups of cell control units Group 0 to Group m in series. The DWT4 topology 700 shows the same group at different times, using different external rails, when $t=t_1$ external rail 1 is used which provide an external positive output voltage, while when $t=t_2$ external rail 2 is used which is connected in reverse and will provide a negative output voltage while the cells is generating positive output voltage in both cases. In some aspects, the DWS can be configured to switch phases between the negative and positive terminals. When the positive terminal of one external energy rail is connected to negative of the other external energy rail and vice versa. In one aspect, the DWT4 topology 700 enables the regulator to generate/receive negative external voltage in respect of its own voltage.

Figure 8A:
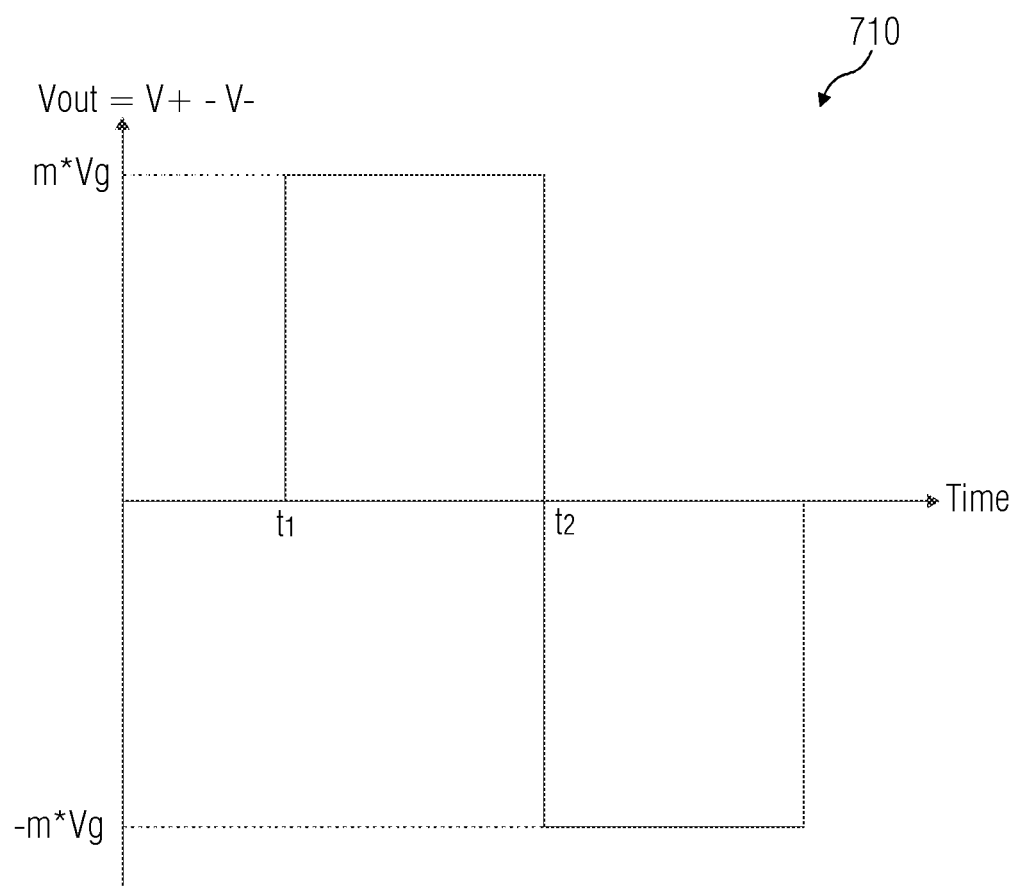
FIG. 8A shows a phase inversion timing diagram, in accordance with at least one aspect of the present disclosure.

FIG. 8A shows a phase inversion timing diagram 710, in accordance with at least one aspect of the present disclosure. The Y-axis represents the system output voltage, defined as voltage difference between V+ and V− terminals shown on FIG. 8 where Vout=V+−V−. The X-axis represents the time. At time $t_1$ the cell control units CCU0/1 to CCU0/n, CCU1/1 to CCU1/n, CCU2/1 to CCU2/n, CCUm/1 to CCUm/n simultaneously switch to rail 1 non-inverting wiring topology 702. The system output voltage at time $t_1$ is m*Vg, where m is the number of groups connected in series and Vg is the output voltage of each group. At time $t_2$ the cell control units CCU0/1 to CCU0/n, CCU1/1 to CCU1/n, CCU2/1 to CCU2/n, CCUm/1 to CCUm/n simultaneously switch to rail inverting topology 704. The system output voltage at time $t_2$ is −m*Vg.

FIG. 9 is a high-level diagram of power bank 800 comprising multiple cell groups connected using DWS, in accordance with at least one aspect of the present disclosure. Each of the energy cell groups Group 0 to Group m comprises a plurality of cell control units CCU. In the example illustrated in FIG. 9, energy cell Group 0 comprises a plurality of cell control units CCU0/0 to CCU0/n, energy cell Group 1 comprises a plurality of cell control units CCU1/0 to CCU1/n, energy cell Group 2 comprises a plurality of cell control units CCU2/0 to CCU2/n, and energy cell Group m comprises a plurality of cell control units CCUm/0 to CCUm/n, where m and n are integers. Multiple Groups and CCUs can be interconnected over positive energy rails 802, 804, 806 and negative energy rails 808, 810, 812. The CCUs in each Group may be interconnected through group energy rails and the Groups may be interconnected over bank energy rails. V+ and V− is the terminal voltage of the power bank 800 which can be connected to a load or to other power banks in a power rack, as described above in FIG. 1. In one aspect, energy rail 802 connects the CCUs in a series topology (DWT3), energy rail 804 connects the CCUs in a parallel topology (DWT2), and energy rail 806 connects the CCUs in a parallel-series topology (DMT1). Other topologies can be implemented, without limitation, by controlling the energy rail switches within each CCU.

With reference now to FIGS. 1 and 9, as previously described, the power bank management unit 110 is a digital circuit that includes one or more central processing units (CPUs) that execute embedded firmware. The firmware can communicate with the world outside of the power bank 104 to get real-time power bank 104 mode of operation. The firmware also manages the underlying CCUs to coordinate the power bank 104 behavior including DWS per energy cell 108 regulators and switches at run time to accommodate the requested mode of operation. The firmware also can collect and share the states and other statistics of individual energy storage elements 112.

The power bank management unit 110 firmware employs a dynamic wiring system and switches/regulators inside each energy cell 108 to create a wide range of charge/discharge power profiles supported by the power bank 104, at high speed and low latency. This allows to create a low latency, programmable control system integrated into the energy storage system 100.

With reference now to FIGS. 1-4, 9, and 10, the power bank 104 also includes a control power source, that powers the control power rail 130, VDD_DIG/GND_DIG, which powers the digital logic circuits 120, 308 of each cell control unit 116, 200, 300 independently from the energy storage element 112, 112a-112n, $ESE_0$-$ESE_n$. This configuration enables an energy storage element 112, 112a-112n, $ESE_0$-$ESE_n$ to be in a disconnected state while still being able to respond to the communication protocol message 900 commands from the power bank management unit 110.

Multiple power banks 104 can be integrated together into a power rack 102; they also can be connected using a rack dynamic wiring system to support multiple power bank 104 wiring topologies and provide wide dynamic range of charge/discharge profiles.

Power bank management units 110 within the power rack 102 can communicate and coordinate with each other, with the outside world, and/or with external management unit that control the whole power rack 102.

Figure 11A:
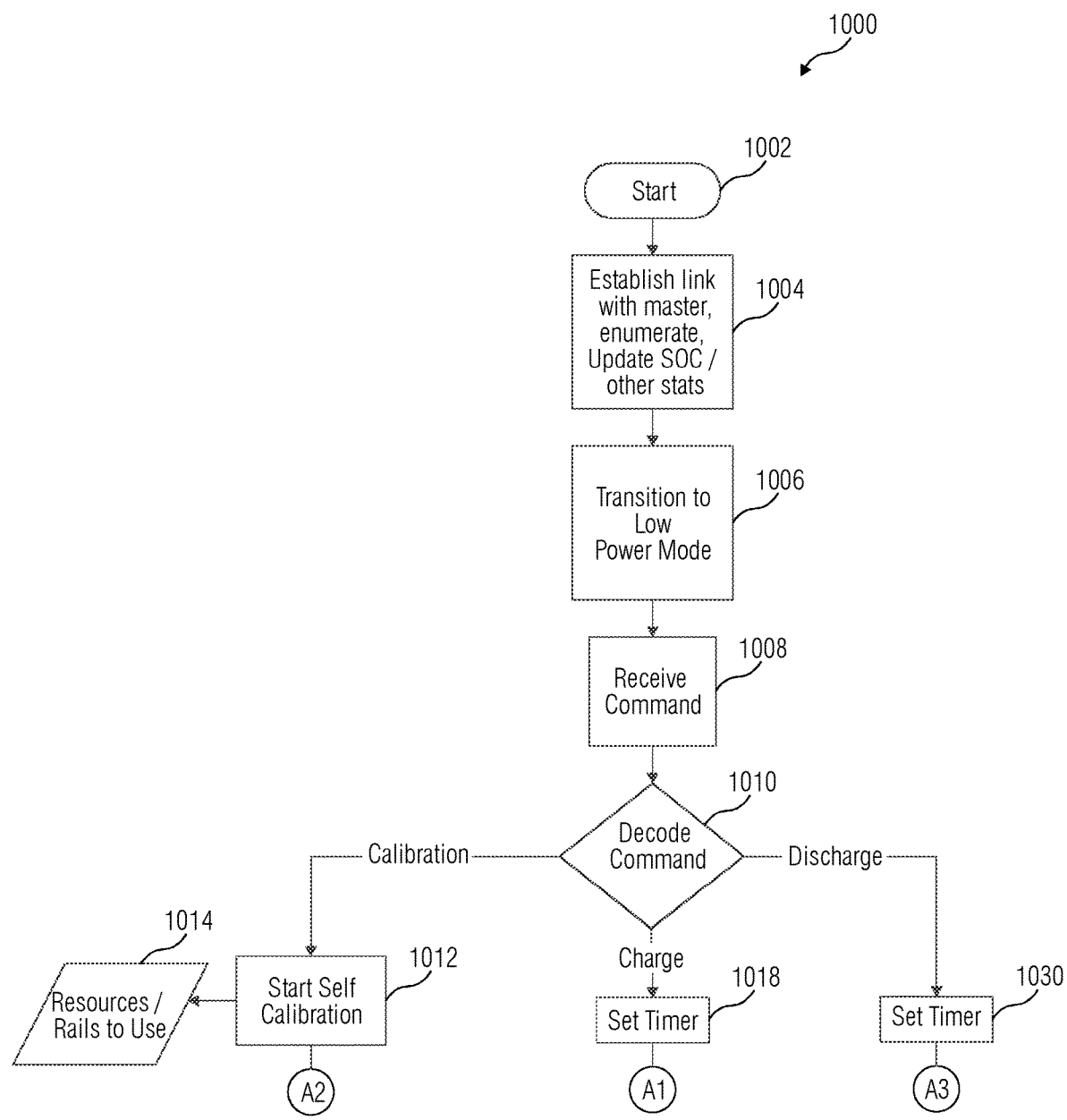
FIGS. 11A-11B is a logic flow diagram of a process depicting a control program or a logic configuration for controlling and managing a cell control unit, in accordance with at least one aspect of the present disclosure.
Figure 11B:
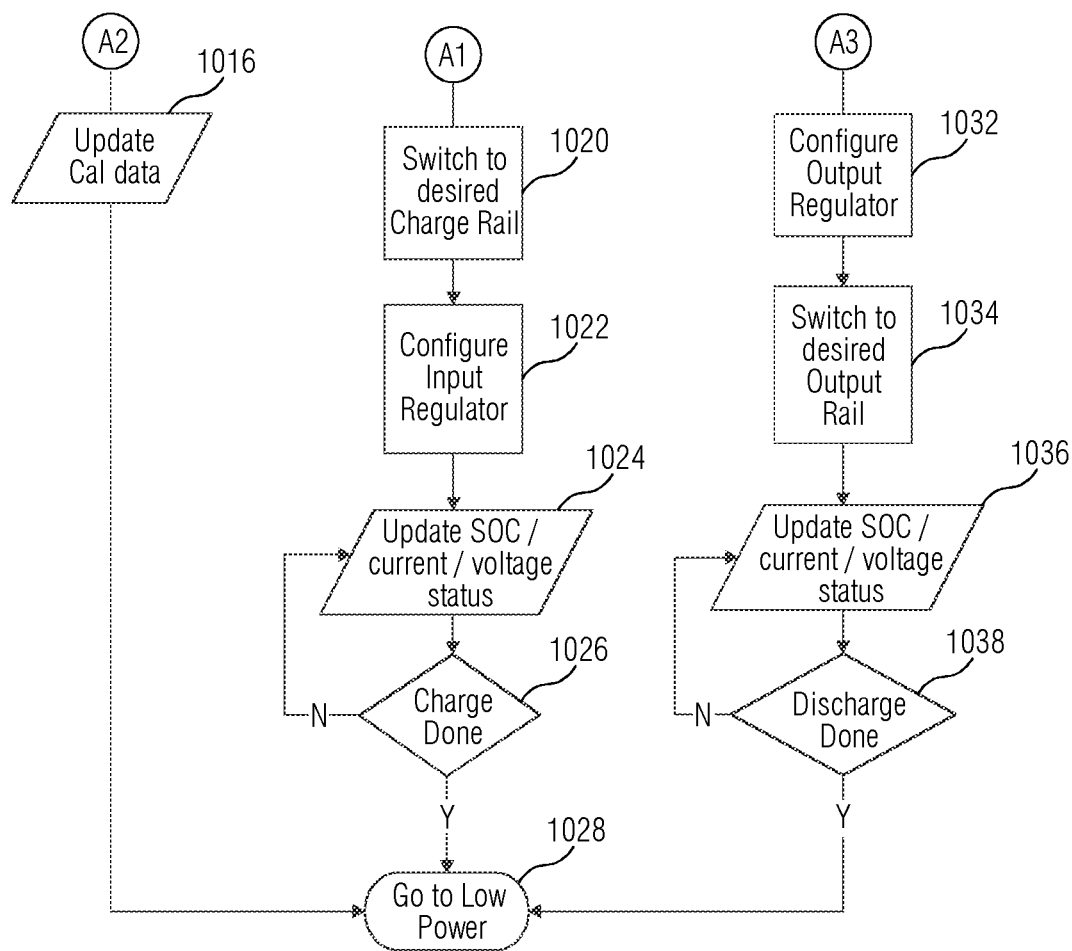

FIGS. 11A-11B is a logic flow diagram 1000 of a process depicting a control program or a logic configuration for controlling and managing a cell control unit, in accordance with at least one aspect of the present disclosure. For conciseness and clarity, the flow diagram 1000 will be described in connection with the energy storage system 100 shown in FIG. 1 and the cell control units 116, 200 shown in FIGS. 2 and 3. The flow diagram 1000, however, is equally applicable to the cell control units 200, 300 shown in FIGS. 3 and 4. During a charge or discharge cycle it is important to control voltage/current that is going to/from the energy cell 108. The control is accomplished based on the individual characteristics of the energy cell 108. The control circuit 120 in conjunction with the energy cell 108 constitute a cell control unit 116. The cell control unit 116 comprises a control circuit 120 comprising a microprocessor running a dedicated firmware or a digital logic circuit executing logic or a combination thereof. The cell control firmware executed by the control circuit 120 optimizes and manages the regulators and switches depending on system mode of operation, the state of charge of the energy storage element 112, the state of life of the energy storage element 112, factory calibrations, current element temperature or other parameters to maximize the energy storage element 112 life cycle, rate of charge/discharge, safety or other desired metrics. To aggregate multiple energy cells 108 they need to be connected electrically to the external rails 126 through the energy rail switches 124. The external energy rails 126 can be pre-wired in a finite number of wiring topologies (DWT1, DWT2, DWT3). The energy rail switches 124 can connect the cell external rail(s) 122*a/b* to one external energy rail 126 that belongs to a certain wiring topology (DWT1, DWT2, DWT3). The control circuit 120 comprises a processor and memory configuration to execute a dedicated firmware or a digital logic circuit executing logic or a combination thereof as described in connection with FIGS. 13 and 14.

At the start 1002 of the execution of the flow diagram 1000 the control circuit 120 establishes 1004 a link between the cell control unit 116 and the master power bank management unit 110 to enumerate, update energy storage element 112 state of charge, among other statistics or metrics described herein. The control circuit 120 then transitions 1006 the cell control unit 116 to a low power mode and waits to receive a command. When the control circuit 120 receives 1008 a command, the control circuit 120 decodes 1010 the command to determine if it is a command for calibrating, charging, or discharging the energy storage element 112.

When the control circuit 120 receives 1008 a calibration command, the control circuit 120 initiates 1012 self calibration and retrieves information 1014 from a database containing the calibration command data such as available resources and which energy rails to use and calibrating the energy storage element 112 accordingly. The control circuit 120 then updates 1016 the calibration data and goes to a low power state 1028.

When the control circuit 120 receives 1008 a charge command, the control circuit 120 sets 1018 a timer, switches 1020 to the desired charge rail and configures 1022 the input regulator. The timer may be set within a register of the control circuit 120. See FIG. 4 for a diagram of a cell control unit 300 showing the input regulator 302. The control circuit 120 then updates 1024 the state of charge/current/voltage status of the energy storage element 112 until the charge is done or reaches a predetermined value 1026 and then goes to the low power state 1028.

When the control circuit 120 receives 1008 a discharge command, the control circuit 120 sets 1030 a timer and configures 1032 the output regulator. See FIG. 4 for a diagram of a cell control unit 300 showing the output regulator 304. The control circuit 120 then switches 1024 to the desired output rail. The control circuit 120 then updates 1036 the state of charge/current/voltage status of the energy storage element 112 until the discharge is done 1038 and then goes to the low power state 1028.

Figure 12A:
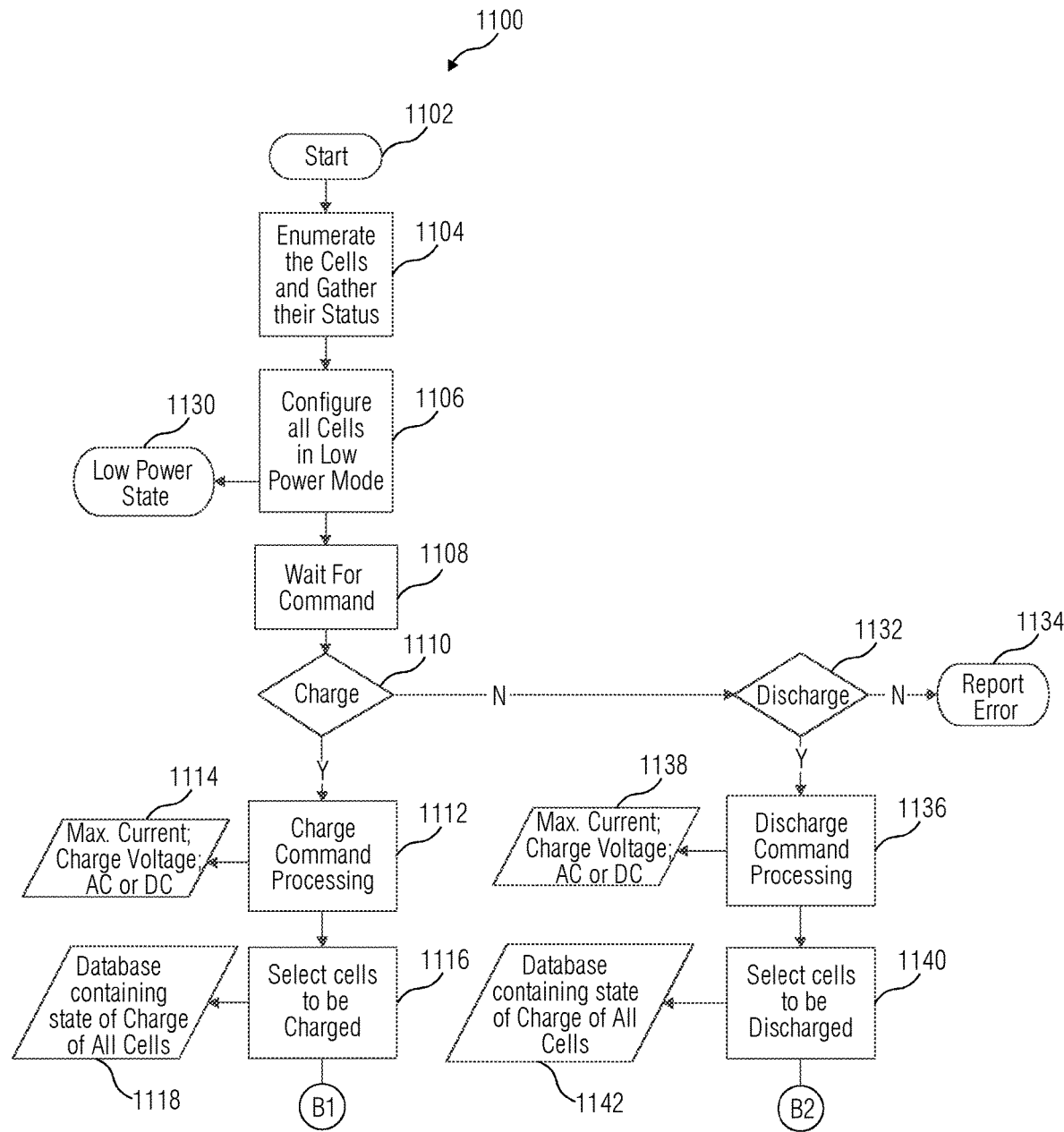
FIGS. 12A-12B is a logic flow diagram of a process depicting a control program or a logic configuration for managing the aggregation and coordination of energy in an energy storage system, in accordance with at least one aspect of the present disclosure.
Figure 12B:
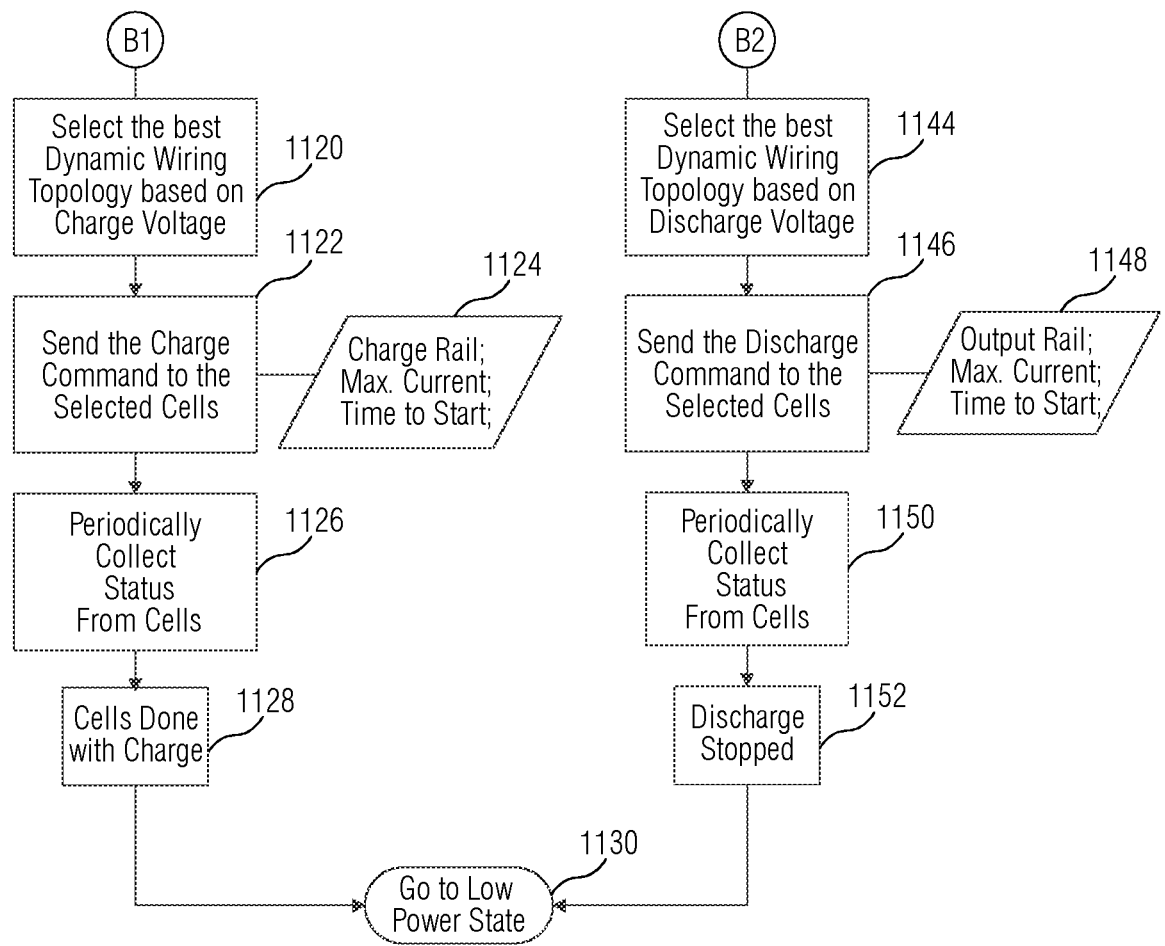

FIGS. 12A-12B is a logic flow diagram 1100 of a process depicting a control program or a logic configuration for managing the aggregation and coordination of energy in an energy storage system 100, in accordance with at least one aspect of the present disclosure. For conciseness and clarity, the flow diagram 1100 will be described in connection with the energy storage system 100 shown in FIG. 1 and the cell control units 116, 200 shown in FIGS. 2 and 3. The power bank management unit 110 executes the dedicated firmware to control the underlying energy cells 108 and dynamic wiring topologies (DWT). The selection of a topology is requested by the power bank management unit 110. The power bank 104 also may have dedicated firmware that manages the aggregation of energy to/from energy storage elements 112, and can coordinate the dynamic wiring topology and cell control unit 116 regulators/switches in response to dynamics of external charge/discharge profiles. These functions are implemented by firmware in the power bank management unit 110. The power bank management unit 110 comprises a control circuit comprising one or multiple processors executing a dedicated firmware or a digital logic circuit executing logic or a combination thereof as described in connection with FIGS. 13 and 14. The power bank management unit 110 firmware executed by the control circuit or processor within the control circuit manages the aggregation and coordination of energy in the power bank 104 and communicates with the energy cells 108 cell control units 116, 200, 300 through the cell communication protocol 128.

Prior to the start 1102 of the execution of the flow diagram 1100, the power management unit 110 establishes a communication link with each one of the energy cell 108 cell control units 116, 200, 300 through the cell communication protocol 128. The control circuit of the power bank management unit 110 enumerates 1104 the energy cells 108 in the power bank 104 and gathers their status. The control circuit configures 1106 all the energy cells 108 in the power bank 104 in low power mode and the energy cells 108 enter a low power state 1130. The control circuit waits 1108 for a charge or discharge command.

When the control circuit of the power management unit 110 receives a charge command 1110, the control circuit processes 1112 the charge command and retrieves information 1114 regarding the energy cell 108 charging characteristics from a database. The charging characteristics including, without limitation, maximum current and charge voltage either AC or DC. The control circuit selects 1116 the energy cells 108 to be charged and retrieves information 1118 from a database containing the state of charge for all energy cells 108. The control circuit selects 1120 the best or optimal dynamic wiring topology (DWT) based on the charging characteristics, such as, for example, the charge voltage and sends 1122 the charge command to the selected energy cells 108 including information 1124 such as charge rail, maximum current, time to start and the selected optimal dynamic wiring topology. The control circuit periodically collects 1126 the status from the energy cells 108. When the energy cells 108 are done 1128 with the charge or reach a predetermined charge level, they are set to the low power state 1130.

When the control circuit of the power management unit 110 receives a discharge command 1132, the control circuit processes 1136 the discharge command and retrieves information 1138 from a database such as maximum current and charge voltage (AC or DC). The control circuit selects 1140 the energy cells 108 to be discharged and retrieves information 1142 from a database containing the state of charge for all energy cells 108. The control circuit selects 1144 the best dynamic wiring topology (DWT) based on the discharging characteristics, such as, for example, discharge voltage and sends 1146 the discharge command to the selected energy cells 108 including information 1148 such as output rail, maximum current, time to start and the selected optimal dynamic wiring topology. The control circuit periodically collects 1150 the status from the energy cells 108. When the discharge is stopped 1152 or reaches a predetermined discharge level, the energy cells 108 are set to the low power state 1130.

With reference now to FIGS. 1-4, 9, 11A-B, and 12A-B, coordination between the power bank management firmware and the cell control firmware is achieved using the communication protocol that allows control and status message exchange using broadcast/multicast/unicast messages 900. The power banks 104 also comprise functionality to communicate externally and coordinate to provide a larger scalable energy storage system 100.

The cell control unit 116, 200, 300 controls voltage/current to/from and individual energy cell 108. The energy cell 108 control is performed by the dedicated firmware.

The energy cell 108 connects to the external power rail(s) via the power switches. All the energy cells 108 within the power bank 104 are connected to the pre-defined pre-wired finite set of the external energy rails. The number of external energy rails can vary depending on the specific implementation.

The communication between power bank management unit 110 and the energy cells 108 is performed by cell communication protocol that provides the control and status message exchange mechanism between the power bank management unit 110 and the energy cells 108. The power banks 104 can optionally communicate between each other to provide an even higher scale energy storage system 100.

Figure 13:
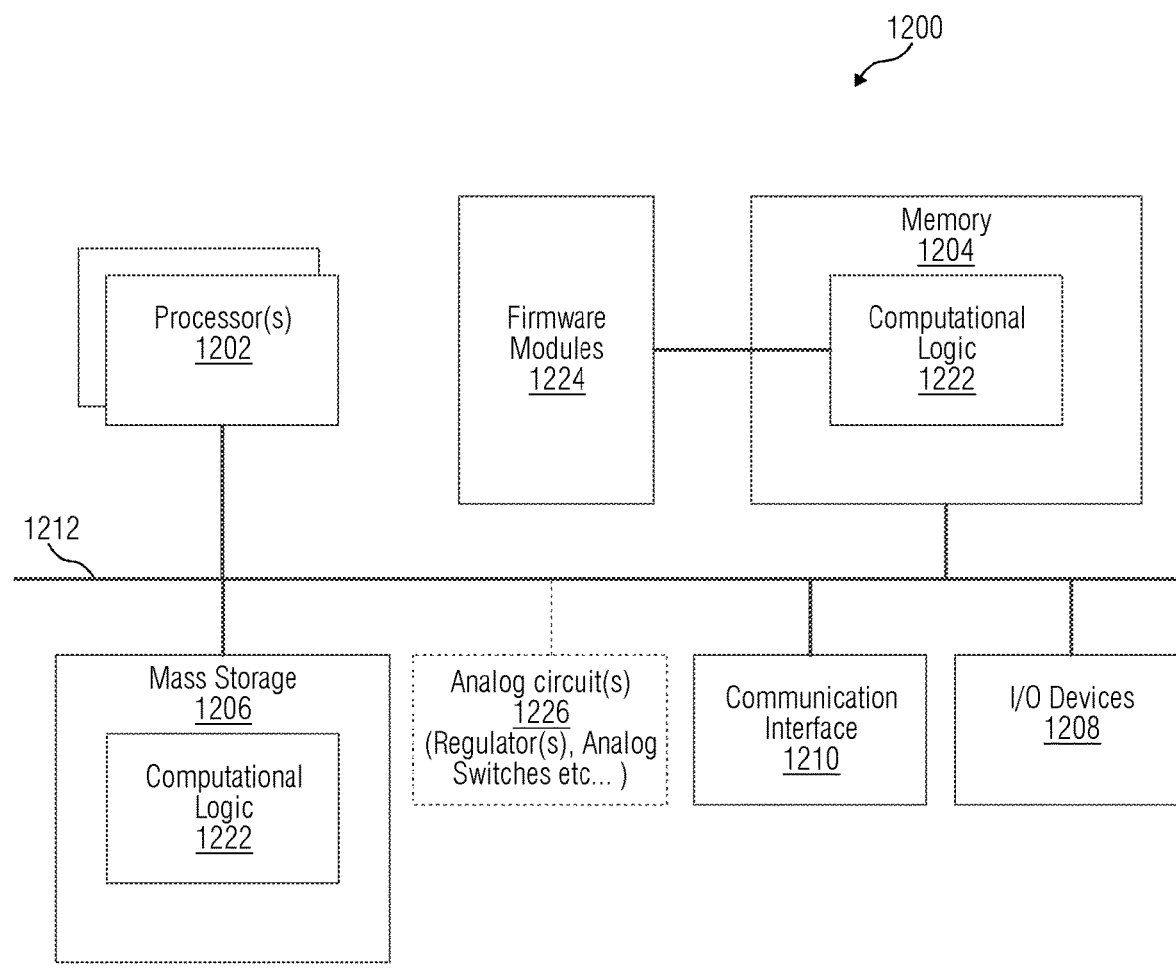
FIG. 13 illustrates an example control circuit suitable for use to practice aspects of the present disclosure described in connection with FIGS. 1-12

FIG. 13 illustrates an example control circuit 1200 suitable for use to practice aspects of the present disclosure described in connection with FIGS. 1-12. In some aspects, the control circuit 1200 may comprise at least a portion of any of the power bank management unit 110, power bank 104, cell control unit 116, 200, 300, or combinations thereof. As shown, the control circuit 1200 may include one or more processors 1202, and system memory 1204. The processor 1202 may include any type of processors. The processor 1202 may be implemented as an integrated circuit having a single core or multi-cores, e.g., a multi-core microprocessor. The control circuit 1200 may include mass storage devices 1206 (such as diskette, hard drive, volatile memory (e.g., DRAM), compact disc read only memory (CD-ROM), digital versatile disk (DVD), flash memory, solid state memory, and so forth). In general, system memory 1204 and/or mass storage devices 1206 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The control circuit 1200 may further include input/output (I/O) devices 1208 such as a microphone, sensors, display, keyboard, cursor control, remote control, gaming controller, image capture device, and so forth and communication interfaces 1210 (such as network interface cards, modems, infrared receivers, radio receivers (e.g., Bluetooth)), antennas, and so forth. In one aspect, the communication interface 1210 is configured fro communication between the power bank management unit 110, power bank 104, cell control unit 116, 200, 300, or combinations thereof, using the cell communication protocol 128 using unidirectional or bidirectional communication protocol messages 900.

In various aspects, the control circuit 120 may comprise analog circuits 1226 coupled to the processor(s) 1202. Examples of analog circuits 1226 include, without limitation, the input/output regulators 320, 304, programmable analog switches such as the programmable energy rail switches 124, 310*a/b*, 312*a/b*, 314*a/b*, 316*a/b*, 318*a/b/c/n*, among other analog circuit elements. As described above, the processor(s) 1202 control the operation of the input/output regulators 320, 304 and the programmable energy rail switches 124, 310*a/b*, 312*a/b*, 314*a/b*, 316*a/b*, 318*a/b/c/n* under the direction of the firmware 1224.

The communication integrated circuits (chips) also may be configured to operate in accordance with wired or wireless standards including, without limitation, Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1210 may operate in accordance with other wireless protocols in other aspects of the present disclosure. Wired protocol include, without limitation, I2C serial protocol for two-wire interface, serial peripheral interface (SPI), controller area network (CAN) BUS, universal asynchronous receive/transmitter (UART), Ethernet, power line communication (PLC) serial interface, or others.

The above-described control circuit 1200 elements may be coupled to each other via a system bus 1212, which may represent one or more buses. In the case of multiple buses, they may be bridged by one or more bus bridges (not shown). Each of these elements may perform its conventional functions known in the art. In particular, the system memory 1204 and the mass storage devices 1206 may be employed to store a working copy and a permanent copy of the programming instructions implementing the operations associated with the network topologies and processes described in reference to FIGS. 1-12, e.g., operations associated with providing one or more of firmware modules 1224 as described above in reference to FIGS. 1-12, generally shown as computational logic 1222. The computational logic 1222 may be implemented by assembler instructions supported by the processor(s) 1202 or high-level languages that may be compiled into such instructions. The permanent copy of the programming instructions may be placed into the mass storage devices 1206 in the factory, or in the field, through, for example, a distribution medium (not shown), such as a compact disc (CD), or through the communication interfaces 1210 (from a distribution server (not shown).

In various aspects, one or more of the firmware modules 1224 may be implemented in hardware integrated with, e.g., communication interface 1210. In other aspects, one or more of the firmware modules 1224 (or some functions of the firmware modules 1224) may be implemented in a hardware accelerator integrated with, e.g., the processor 1202, to accompany the central processing units (CPU) of the processor 1202 to execute the processes 1000, 1100 described herein in reference to FIGS. 11-12.

Figure 14:
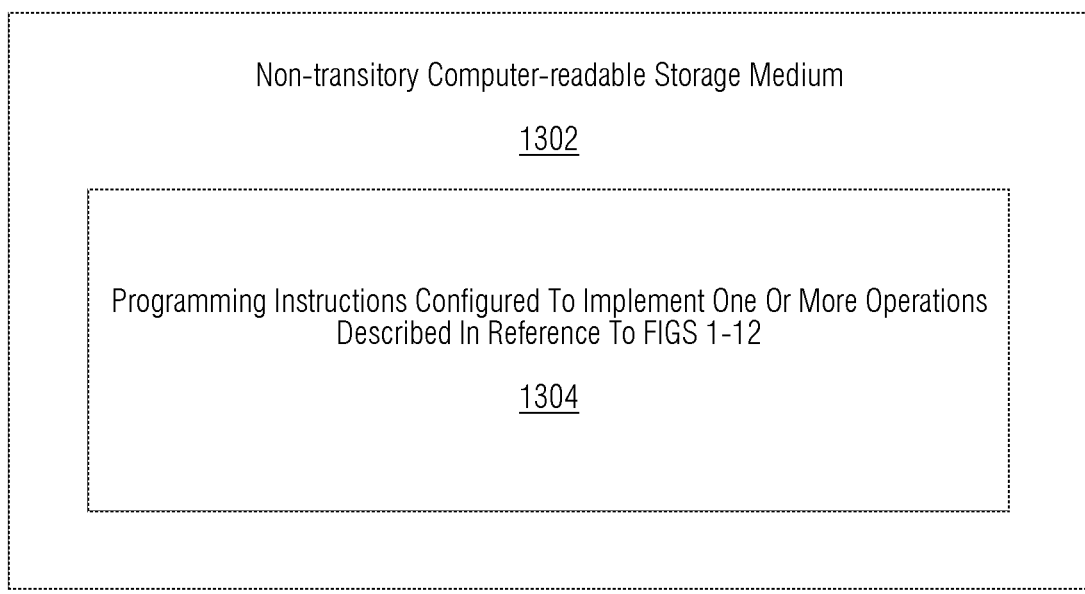
FIG. 14 illustrates an example non-transitory computer-readable storage medium having instructions configured to practice all or selected ones of the operations associated with aspects of the present disclosure.

FIG. 14 illustrates an example non-transitory computer-readable storage medium 1302 having instructions configured to practice all or selected ones of the operations associated with aspects of the present disclosure described above. As illustrated, the non-transitory computer-readable storage medium 1302 may include a number of programming instructions 1304 configured to implement one or more of the firmware modules 1224, or the processes 1000, 1100 described herein in reference to FIGS. 11-12. The programming instructions 1304 may be configured to enable a device, e.g., the control circuit 1200, in response to execution of the programming instructions, to perform one or more operations of the processes described in reference to FIGS. 1-12. In alternate aspects, programming instructions 1304 may be disposed on multiple non-transitory computer-readable storage media 1302 instead. In still other aspects, the programming instructions 1304 may be encoded in transitory computer-readable signals.

Referring again to FIG. 13, the number, capability, and/or capacity of the elements 1208, 1210, 1212 may vary, depending on whether the control circuit 1200 is used as a stationary computing device, such as a set-top box or desktop computer, or a mobile computing device, such as a tablet computing device, laptop computer, game console, an Internet of Things (IoT), smartphone, or embedded in the power bank management unit 110, power bank 104, or cell control unit 116, 200, 300. Their constitutions are otherwise known, and accordingly will not be further described.

At least one of the processors 1202 may be packaged together with memory having the computational logic 1222 (or portion thereof) configured to practice aspects described in reference to FIGS. 1-12. For example, the computational logic 1222 may be configured to include or access one or more of the firmware modules 1224. In some aspects, at least one of the processors 1202 (or portion thereof) may be packaged together with memory having computational logic 1222 configured to practice aspects of the processes 1000, 1100 in reference to FIGS. 11-12 to form a system in package (SiP) or a system on chip (SoC).

In various implementations, the control circuit 1200 may comprise an embedded computer coupled to a server, a router, a switch, or a gateway. In further implementations, the control circuit 1200 may be any other electronic device that processes data.

In various aspects, the present disclosure describes a self-contained energy storage system 100. The energy storage system 100 may be configured to extend the life span of the energy cells 108 or energy storage elements 112. The energy storage system 100 comprises system external energy rails need to be connected to a desired load such as, for example, electric vehicle (EV) motors, charging station output, power grid, among others. The system input energy rails may be configured to be connected to a charge source such as, for example, the power grid, wind/solar/mechanical power generator, among others. The energy storage system 100 can be configured to optimize the energy cell 108 or energy storage element 112 charge/discharge profiles or cycles for each energy cell 108 or energy storage element 112.

Although certain aspects have been illustrated and described herein for purposes of description, a wide variety of alternate and/or equivalent aspects or implementations calculated to achieve the same purposes may be substituted for the aspects shown and described without departing from the scope of the present disclosure. This application is intended to cover any adaptations or variations of the embodiments discussed herein.

Examples of the methods and/or systems of various aspects of the present disclosure are provided below. An aspect of the methods and/or systems may include any one or more than one, and any combination of, the examples described below.

Example 1 is a scalable energy storage system, comprising: a power rack comprising: at least one power bank comprising: a control power source; a power bank management unit; and a plurality of energy cells interconnected by external energy rails, wherein each one of the plurality of energy cells comprises a first cell control unit, the cell control unit comprising: at least one energy storage element; a control power rail; a control circuit having an input coupled to the at least one energy storage element by an internal energy rail, an output coupled to a cell energy rail, and coupled to the control power source through the control power rail; a plurality of energy rail switches coupled to the control circuit through the cell energy rail; wherein the control circuit is configured to: control the plurality of energy rail switches to couple the cell energy rail to the external energy rails in a predetermined configurable dynamic wiring topology to implement a dynamic wiring system; and communicate with a second cell control unit using a cell communication protocol.

Example 2 may include the subject matter of claim 1, wherein the control circuit is configured to control the plurality of energy rail switches to couple the at least one energy storage element in series with another energy storage element located in a second cell control unit coupled to the external energy rails.

Example 3 may include the subject matter of any one or more of Examples 1-2, wherein the control circuit is configured to control the plurality of energy rail switches to couple the at least one energy storage element in parallel with another energy storage element located in a second cell control unit coupled to the external energy rails.

Example 4 may include the subject matter of any one or more of Examples 1-3, wherein the control circuit is configured to control the plurality of energy rail switches to couple the at least one energy storage element either in parallel or in series with another energy storage element located in a second cell control unit coupled to the external energy rails.

Example 5 may include the subject matter of any one or more of Examples 1-4, wherein the control circuit comprises at least one regulator coupled to the internal energy rail and the cell energy rail, wherein the at least one regulator is configured to charge or discharge the at least one energy storage element according to characteristics of the at least one energy storage element.

Example 6 may include the subject matter of Examples 5, wherein the at least one regulator comprises an input regulator coupled to the internal energy rail and an output regulator coupled to the cell energy rail, wherein the input regulator is configured to charge the at least one energy storage element and the second regulator is configured to discharge the at least one energy storage element.

Example 7 may include the subject matter of any one or more of Examples 5-6, wherein the at least one energy storage element is a form of electric battery cell that can hold energy at predetermined density and can be charged and discharged multiple times, wherein the at least one energy storage element characteristics comprise state of charge, defined as the amount of energy stored by the at least one energy storage element or state of life, defined as the maximum usable power storage of the least one energy storage element.

Example 8 may include the subject matter of any one or more of Examples 5-7, wherein the at least one regulator is configured to control the voltage and current of the at least one energy storage element.

Example 9 may include the subject matter of Example 8, wherein the at least one regulator is a programmable regulator configured to regulate voltage and current on the external energy rails to the internal energy rail.

Example 10 may include the subject matter of any one or more of Examples 8-9, wherein the at least one regulator is a programmable regulator configured to regulate voltage and current on the internal energy rail to the external energy rails.

Example 11 may include the subject matter of any one or more of Examples 5-10, wherein the plurality of energy rail switches are programmable switches configured to connect or disconnect the internal energy rail from the at least one regulator.

Example 12 may include the subject matter of any one or more of Examples 1-11, wherein the plurality of energy rail switches are programmable switches configured to connect or disconnect the cell energy rail to and from the external energy rails.

Example 13 may include the subject matter of any one or more of Examples 1-12, wherein the at least one energy storage element comprises a temperature sensor coupled to the control circuit to measure the temperature of the at least one energy storage element.

Example 14 may include the subject matter of any one or more of Examples 1-13, wherein the control circuit is configured to measure voltage and current on the internal and external energy rails.

Example 15 may include the subject matter of any one or more of Examples 1-14, wherein the control circuit comprises a processor and a memory storing instructions that when executed causes the processor to control voltage and current of the at least one energy storage element, the plurality of energy rail switches, or implement the cell communication protocol, or combinations thereof.

Example 16 may include the subject matter of Example 15, further comprising instructions that when executed causes the processor to manage state of charge or state of life of the at least one energy storage element during charge and voltage and current of the external energy rails during discharge.

Example 17 may include the subject matter of any one or more of Examples 1-16, wherein the control power rail is independent of the at least one energy storage element regardless of a state of charge of the at least one energy storage element.

Example 18 may include the subject matter of any one or more of Examples 1-17, wherein the first cell control unit is configured to communicate with the power bank management unit using the cell communication protocol.

Example 19 may include the subject matter of Example 18, wherein the power bank management unit is configured to discover a location and neighbors of the first cell control unit within a group of cell control units.

Example 20 may include the subject matter of any one or more of Examples 18-19, wherein the first cell control unit is configured to communicate with the power bank management unit with multicast, broadcast, or unicast messages, or combinations thereof using the cell communication protocol.

Example 21 may include the subject matter of any one or more of Examples 18-20, wherein the energy cells within the power bank are time-synchronized by power bank control unit using the cell communication protocol or dedicated communication line.

Example 22 may include the subject matter of any one or more of Examples 1-21, wherein a group of cell control units share a group energy rail and are connected in parallel to the external energy rails from each one of the energy cells.

Example 23 may include the subject matter of Example 22, wherein a number of the group energy rails match the number of the external energy rails for each cell control unit in the group of cell control units.

Example 24 may include the subject matter of any one or more of Examples 1-23, wherein the dynamic wiring system comprises multiple dynamic wiring topologies that connect group energy rails in various parallel or serial configurations, or combinations thereof.

Example 25 may include the subject matter of Example 24, wherein each group energy rail belongs to a single dynamic wiring topology and can be selected at run time by the cell control units in the group of cell control units to implement a wide dynamic range of voltage or current profiles, or combinations thereof.

Example 26 may include the subject matter of Example 25, wherein the control circuit is configured to switch to or from a new dynamic wiring topology using the cell communication protocol to time-synchronize all the cell control units within the group of cell control units and throughout the power bank.

Example 27 may include the subject matter of any one or more of Examples 1-26, wherein the power bank is connected to another power bank using a rack dynamic wiring system to connect bank energy rails into rack energy rails using dynamic configurations.

Example 28 is a method of controlling and managing a cell control unit including a first cell control unit, the cell control unit including at least one energy storage element; a control power rail; a control circuit having an input coupled to the at least one energy storage element by an internal energy rail, an output coupled to a cell energy rail, and coupled to the control power source through the control power rail; a plurality of energy rail switches coupled to the control circuit through the cell energy rail, wherein the control circuit is configured to control the plurality of energy rail switches to couple the cell energy rail to the external energy rails in a predetermined configurable dynamic wiring topology to implement a dynamic wiring system; and communicate with a second cell control unit using a cell communication protocol; wherein the control circuit includes at least one regulator coupled to the internal energy rail and the cell energy rail, wherein the at least one regulator is configured to charge or discharge the at least one energy storage element according to characteristics of the at least one energy storage element; the method comprising: establishing a link, by the control circuit, between the cell control unit and a master power bank management unit; transitioning, by the control circuit, the energy storage element to a low power mode; receiving, by the control circuit, a command through the cell control protocol; decoding, by the control circuit, a task directed by the command and executing one of: calibrating, by the control circuit, the energy storage element, wherein the received command is a calibration command; charging, by the control circuit, the energy storage element, wherein the received command is a charge command; or discharging, by the control circuit, the energy storage element, wherein the received command is a discharge command.

Example 29 may include the subject matter of Example 28, wherein the received command is a calibrating command: initiating, by the control circuit, a self calibration of the energy storage element, by the control circuit; retrieving, by the control circuit, information from a database about available resources and which energy rails to use; and updating, by the control circuit, the database with calibration data.

Example 30 may include the subject matter of any one or more of Examples 28-29, wherein the received command is a charging command: setting a timer, by the control circuit; switching the energy rail switches, by the control circuit, to couple the energy storage element to a predetermined charging rail; configuring, by the control circuit, the at least one regulator to charge the energy storage element; updating the database, by the control circuit, with a state of charge, current status, and voltage status of the energy storage element until charging reaches a predetermined value; and setting, by the control circuit, the energy storage element to a low power mode.

Example 31 may include the subject matter of any one or more of Examples 28-30, wherein the received command is a discharging command: setting a timer, by the control circuit; configuring, by the control circuit, the at least one regulator to discharge the energy storage element; switching the energy rail switches, by the control circuit, to couple the energy storage element to a predetermined discharging rail; updating the database, by the control circuit, with a state of charge, current status, and voltage status of the energy storage element until discharging reaches a predetermined value; and setting, by the control circuit, the energy storage element to a low power mode.

Example 32 is a method of managing the aggregation and coordination of energy by a power bank management unit, the power bank management unit coupled to a plurality of energy cells located in a power bank each one of the plurality of energy cells including a cell control unit, the power bank management unit configured to communicate with each one of the plurality of energy cells through a cell communication protocol, the power bank management unit comprising a processor and a memory storing instructions executable by the processor, the method comprising: establishing, by the processor, a communication link between the power bank management unit and the cell control units of each one of the plurality of energy cells through the cell communication protocol; enumerating, by the processor, the plurality of energy cells located in a power bank, wherein each one of the energy cells comprises an element management unit and an energy storage element forming a single managed cell control unit; configuring, by the processor, all the energy cells in a low power mode through the cell control; receiving, by the processor, a command; decoding, by the processor, a task directed by the command and executing one of: sending a charge command, by the processor, to a selected number of energy cells wherein the command is a charge command; and sending a discharge command, by the processor, to a selected number of energy cells wherein the command is a charge command.

Example 33 may include the subject matter of Examples 32, wherein the received command is a charge command: processing, by the processor, the charge command to determine charging characteristics; selecting, by the processor, energy cells to be charged; selecting, by the processor, an optimal dynamic wiring topology based on the charging characteristics; sending, by the processor, the selected dynamic wiring topology to the cell control units of the selected energy cells; periodically collecting, by the processor, charging status of the selected energy cells until the selected energy cells reach a predetermined charge level; sending, by the processor, a command to the selected energy cells to set the selected energy cells in a low power state.

Example 34 may include the subject matter of any one or more of Examples 32-33, wherein the received command is a discharge command: processing, by the processor, the discharge command to determine discharging characteristics; selecting, by the processor, energy cells to be discharged; selecting, by the processor, an optimal dynamic wiring topology based on the discharging characteristics; sending, by the processor, the selected dynamic wiring topology to the cell control units of the selected energy cells; periodically collecting, by the processor, discharging status of the selected energy cells until the selected energy cells reach a predetermined discharge level; sending, by the processor, a command to the selected energy cells to set the selected energy cells in a low power state.

The invention claimed is:

1. A scalable energy storage system, comprising:
a power rack comprising:
at least one power bank comprising:
a power bank management unit; and
a plurality of energy cells interconnected by external energy rails, wherein each one of the plurality of energy cells comprises a first cell control unit, the first cell control unit comprising:
at least one energy storage element;
a control power rail;
a control circuit having an input coupled to the at least one energy storage element by an internal energy rail, an output coupled to a cell energy rail, and coupled to the control power rail;
a plurality of energy rail switches coupled to the control circuit through the cell energy rail;
wherein the control circuit is configured to:
independently control and manage the at least one energy storage element;
control the plurality of energy rail switches to couple the cell energy rail to the external energy rails in a predetermined configurable dynamic wiring topology to implement a dynamic wiring system; and
communicate with a second cell control unit using a cell communication protocol.

2. The scalable energy storage system of claim 1, wherein the control circuit is configured to control the plurality of energy rail switches to couple the at least one energy storage element in series with another energy storage element located in a second cell control unit coupled to the external energy rails.

3. The scalable energy storage system of claim 1, wherein the control circuit is configured to control the plurality of energy rail switches to couple the at least one energy storage element in parallel with another energy storage element located in a second cell control unit coupled to the external energy rails.

4. The scalable energy storage system of claim 1, wherein the control circuit is configured to control the plurality of energy rail switches to couple the at least one energy storage element either in parallel or in series with another energy storage element located in a second cell control unit coupled to the external energy rails.

5. The scalable energy storage system of claim 1, wherein the control circuit comprises at least one regulator coupled to the internal energy rail and the cell energy rail, wherein the at least one regulator is configured to charge or discharge the at least one energy storage element according to characteristics of the at least one energy storage element.

6. The scalable energy storage system of claim 5, wherein the at least one regulator comprises an input regulator coupled to the internal energy rail and an output regulator coupled to the cell energy rail, wherein the input regulator is configured to charge the at least one energy storage element and the output regulator is configured to discharge the at least one energy storage element.

7. The scalable energy storage system of claim 5, wherein the at least one energy storage element is a form of electric battery cell that can hold energy at predetermined density and can be charged and discharged multiple times, wherein the characteristics of the at least one energy storage element comprise state of charge, defined as an amount of energy stored by the at least one energy storage element or state of life, defined as the maximum usable power storage of the least one energy storage element.

8. The scalable energy storage system of claim 5, wherein the at least one regulator is configured to control a voltage and current of the at least one energy storage element.

9. The scalable energy storage system of claim 8, wherein the at least one regulator is a programmable regulator configured to regulate the voltage and current on the external energy rails to the internal energy rail.

10. The scalable energy storage system of claim 8, wherein the at least one regulator is a programmable regulator configured to regulate the voltage and current on the internal energy rail to the external energy rails.

11. The scalable energy storage system of claim 5, wherein the plurality of energy rail switches are configured to connect or disconnect the internal energy rail from the at least one regulator by the control circuit.

12. The scalable energy storage system of claim 1, wherein the plurality of energy rail switches are configured to connect or disconnect the cell energy rail to and from the external energy rails by the control circuit.

13. The scalable energy storage system of claim 1, wherein the at least one energy storage element comprises a temperature sensor coupled to the control circuit to measure the temperature of the at least one energy storage element.

14. The scalable energy storage system of claim 1, wherein the control circuit is configured to measure voltage and current on the internal energy rail and external energy rail.

15. The scalable energy storage system of claim 1, wherein the control circuit comprises a processor and a memory storing instructions that when executed causes the processor to control voltage and current of the at least one energy storage element, the plurality of energy rail switches, or implement the cell communication protocol, or combinations thereof.

16. The scalable energy storage system of claim 15, further comprising instructions that when executed causes the processor to manage state of charge or state of life of the at least one energy storage element during charge and voltage and current of the external energy rails during discharge.

17. The scalable energy storage system of claim 1, wherein the control power rail is independent of the at least one energy storage element regardless of a state of charge of the at least one energy storage element.

18. The scalable energy storage system of claim 1, wherein the first cell control unit is configured to communicate with the power bank management unit using the cell communication protocol.

19. The scalable energy storage system of claim 18, wherein the power bank management unit is configured to discover a location and neighbors of the first cell control unit within a group of cell control units.

20. The scalable energy storage system of claim 18, wherein the first cell control unit is configured to communicate with the power bank management unit with multicast, broadcast, or unicast messages, or combinations thereof using the cell communication protocol.

21. The scalable energy storage system of claim 18, wherein the plurality of energy cells within the power bank are time-synchronized by power bank control unit using the cell communication protocol or dedicated communication line.

22. The scalable energy storage system of claim 1, wherein a group of cell control units share a group energy rail and are connected in parallel to the external energy rails from each one of the plurality of energy cells.

23. The scalable energy storage system of claim 22, wherein a number of the group energy rails match the number of the external energy rails for each cell control unit in the group of cell control units.

24. The scalable energy storage system of claim 1, wherein the dynamic wiring system comprises multiple dynamic wiring topologies that connect group energy rails in various parallel or serial configurations, or combinations thereof.

25. The scalable energy storage system of claim 24, wherein each group energy rail belongs to a single dynamic wiring topology and can be selected at run time by cell control units in the group of cell control units to implement a wide dynamic range of voltage or current profiles, or combinations thereof.

26. The scalable energy storage system of claim 25, wherein the control circuit is configured to switch a dynamic wiring topology using the cell communication protocol to time-synchronize all the cell control units within the group of cell control units and throughout the power bank.

27. The scalable energy storage system of claim 1, wherein the power bank is connected to another power bank using a rack dynamic wiring system to connect bank energy rails into rack energy rails using dynamic configurations.

* * * * *